US007065751B2

(12) United States Patent
Hagiwara et al.

(10) Patent No.: US 7,065,751 B2
(45) Date of Patent: Jun. 20, 2006

(54) PROGRAM EXECUTION DEVICE OPERATING BASED ON COMPRESSED CODE

(75) Inventors: Masato Hagiwara, Hyogo (JP); Toyohiko Yoshida, Hyogo (JP); Mamoru Sakamoto, Hyogo (JP)

(73) Assignee: Renesas Technology Corp., Tokyo (JP)

( * ) Notice: Subject to any disclaimer, the term of this patent is extended or adjusted under 35 U.S.C. 154(b) by 545 days.

(21) Appl. No.: 10/073,215

(22) Filed: Feb. 13, 2002

(65) Prior Publication Data

US 2004/0015895 A1 Jan. 22, 2004

(30) Foreign Application Priority Data

Apr. 23, 2001 (JP) ............................. 2001-124824

(51) Int. Cl.
*G06F 9/45* (2006.01)
(52) U.S. Cl. ...................................... 717/139
(58) Field of Classification Search ......... 717/136–148
See application file for complete search history.

(56) References Cited

U.S. PATENT DOCUMENTS

| 5,768,597 | A | * | 6/1998 | Simm ......................... 717/174 |
| 5,794,049 | A | * | 8/1998 | Lindholm ..................... 717/136 |
| 6,083,279 | A | * | 7/2000 | Cuomo et al. ................ 717/118 |
| 6,279,079 | B1 | | 8/2001 | Sakamoto |
| 6,289,506 | B1 | * | 9/2001 | Kwong et al. ................ 717/148 |

(Continued)

FOREIGN PATENT DOCUMENTS

JP 10-228380 8/1998

OTHER PUBLICATIONS

Charles Lefurgy, Peter Bird, I-Cheng Chen, Travor Mudge, Improving Code Density Using Compression Techniques, Dec. 1997.*
Iffat H. Kazi, Howard H. Chen, Berdenia Stanley, David J. Lilja, Techniques for Obtaining High Performance in Java Programs, Sep. 2000, ACM Computing Surveys, vol. 32, No. 3, pp. 213-240.*
Lars Raeder Clausen, Ulrik Pagh Schultz, Charles Consel and Gilles Muller, Java Bytecode Compression for Embedded Systems, Dec. 1998, Institut De Recherche En Informatique Et Systemes Aleatoires (IRISA), Publication No. 1213, pp. 1-22.*
Quetzalcoatl Bradley, R. Nigel Horspool, Jan Vitek, JAZZ: An Efficient Compressed Format for Java Archive Files, Dec. 1998, In Proceedings of CASCON '98, Toronto.□□.*
K. R. Bowers and D. Kaeli. Characterizing the SPEC JVM98 benchmarks on the Java virtual machine. 1998. Technical report, Northeastern University, Dept. of ECE, Computer Architecture Group.*

*Primary Examiner*—Kakali Chaki
*Assistant Examiner*—Trenton J. Roche
(74) *Attorney, Agent, or Firm*—McDermott Will & Emery LLP

(57) ABSTRACT

A program execution device with a small required memory storage capacity includes: a compressed code storing portion storing a code which has been compressed on a prescribed unit basis of a program described in a prescribed language; an expanding portion connected to the compressed code storing portion for expanding the compressed code stored in the compressed code storing portion; a code storing portion connected to the expanding portion for storing the code expanded by the expanding portion; and an interpreter portion connected to the code storing portion for interpreting and executing the expanded code.

17 Claims, 36 Drawing Sheets

U.S. PATENT DOCUMENTS

| | | | |
|---|---|---|---|
| 6,336,216 B1 * | 1/2002 | Curtis et al. | 717/174 |
| 6,513,156 B1 * | 1/2003 | Bak et al. | 717/151 |
| 6,549,995 B1 * | 4/2003 | Schulz et al. | 711/202 |
| 6,631,515 B1 * | 10/2003 | Berstis | 717/140 |
| 6,637,025 B1 * | 10/2003 | Beadle et al. | 717/148 |
| 6,654,954 B1 * | 11/2003 | Hicks | 717/162 |
| 6,691,305 B1 * | 2/2004 | Henkel et al. | 717/136 |
| 6,820,252 B1 * | 11/2004 | Sakamoto et al. | 717/136 |

* cited by examiner

FIG.3

| RAM | 8 |
|---|---|
| OPERATING SYSTEM | 16 |
| VIRTUAL MACHINE (VM) MODULE | 18 |
|     INTERPRETER | 20 |
|     JIT | 22 |
| COMPRESSION MODULE | 24 |
| EXPANSION MODULE | 26 |
| CODE | 28 |
|     EXPANDED BYTE CODE | 30 |
|     NATIVE CODE | 32 |
|     COMPRESSED NATIVE CODE | 34 |
| METHOD STATUS | 36 |
|     EXECUTION FREQUENCY | 38 |
|     SIZE | 40 |
|     NATIVE CODE PRESENCE FLAG | 42 |
|     COMPILED TIME (ORDER) | 44 |
|     COMPRESSION INFORMATION | 46 |
|         COMPRESSION FLAG | 48 |
|         EXPANSION FLAG | 50 |
|         COMPRESSION MODE | 52 |
|         COMPRESSION RATIO | 54 |
|         COMPRESSED TIME (ORDER) | 56 |
|         COMPRESSION SIZE | 58 |

FIG.7

| RAM | 8 |
|---|---|
| OPERATING SYSTEM | 16 |
| VIRTUAL MACHINE (VM) MODULE | 18 |
|    INTERPRETER | 20 |
|    JIT | 22 |
| COMPRESSION MODULE | 24 |
| EXPANSION MODULE | 26 |
| CODE | 28 |
|    EXPANDED BYTE CODE | 30 |
|    NATIVE CODE | 32 |
|    COMPRESSED NATIVE CODE | 34 |
| REFERENCE BLOCK STATUS | 60 |
|    EXECUTION FREQUENCY | 62 |
|    SIZE | 64 |
|    NATIVE CODE PRESENCE FLAG | 66 |
|    COMPILED TIME (ORDER) | 68 |
|    COMPRESSION INFORMATION | 70 |
|       COMPRESSION FLAG | 72 |
|       EXPANSION FLAG | 74 |
|       COMPRESSION MODE | 76 |
|       COMPRESSION RATIO | 78 |
|       COMPRESSED TIME (ORDER) | 80 |
|       COMPRESSION SIZE | 82 |

FIG.9

| RAM | 8 |
|---|---|
| OPERATING SYSTEM | 16 |
| VIRTUAL MACHINE (VM) MODULE | 18 |
|    INTERPRETER | 20 |
|    JIT | 22 |
| COMPRESSION MODULE | 24 |
| EXPANSION MODULE | 26 |
| CODE | 28 |
|    EXPANDED BYTE CODE | 30 |
|    NATIVE CODE | 32 |
|    COMPRESSED NATIVE CODE | 34 |
| INSTRUCTION STATUS | 90 |
|    EXECUTION FREQUENCY | 92 |
|    SIZE | 94 |
|    NATIVE CODE PRESENCE FLAG | 96 |
|    COMPILED TIME (ORDER) | 98 |
|    COMPRESSION INFORMATION | 100 |
|       COMPRESSION FLAG | 102 |
|       EXPANSION FLAG | 104 |
|       COMPRESSION MODE | 106 |
|       COMPRESSION RATIO | 108 |
|       COMPRESSED TIME (ORDER) | 110 |
|       COMPRESSION SIZE | 112 |

PROGRAM EXECUTION DEVICE OPERATING BASED ON COMPRESSED CODE

BACKGROUND OF THE INVENTION

1. Field of the Invention

The present invention relates to program execution devices and methods thereof and, more particularly to a program execution device with a small required memory storage capacity for storing data and a method thereof.

2. Description of the Background Art

A program which is described in a Java® (a registered trademark of Sun Microsystems, U.S.A.) language is compiled into a code called a byte code which is independent of a platform prior to execution, and then distributed. A Java® virtual machine executes a program by interpreting and executing byte codes on an instruction basis with use of an interpreter. Recently, the Java® virtual machine is adapted to convert the byte code to a native code with use of a JIT (Just-in-time Compiler) rather than directly executing byte codes for high-speed execution of a program.

Such programs described in a JAVA® language are widely used in built-in devices such as portable telephones, PDAs (Personal Digital Assistants) and information appliances.

However, a built-in device can use an ROM (Read Only Memory) or RAM (Random Access Memory) which has a smaller storage capacity as compared with a usual computer. Thus, a program with a large number of steps cannot be executed by the built-in device.

SUMMARY OF THE INVENTION

The present invention is made to solve the aforementioned program. An object of the present invention is to provide a program execution device which requires a small memory storage capacity.

A program execution device according to one aspect of the present invention executes a program described in a prescribed language. The program execution device includes: a compressed code storing portion storing a code of a program which has been compressed on a basis of a prescribed unit; an expanding portion connected to the compressed code storing portion for expanding the compressed code stored in the compressed code storing portion; a code storing portion connected to the expanding portion for storing the code expanded by the expanding portion; and an interpreter portion connected to the code storing portion for interpreting and executing the expanded code.

The code is compressed on a basis of a prescribed unit and stored in the compressed code storing portion. Thus, the compressed code storing portion requires a small storage capacity, so that the storage capacity of the memory required for the program execution device can be reduced.

Preferably, the prescribed unit refers to a series of instructions not containing branching in the program.

Codes of the series of instructions not containing branching are stored in the code storing portion. Thus, the code storing portion may have a smaller storage capacity than when storing a code of a method, whereby the storage capacity of the memory required for the program execution device can be reduced.

More preferably, the program execution device includes a compression mode determining portion connected to the compressed code storing portion for determining a compression mode of the code in accordance with the compressed code. The expanding portion is further connected to the mode determining portion for expanding the compressed code and storing it in the code storing portion in accordance with an output from the compression mode determining portion.

A user can select a compression mode of the code for every method to employ an optimum compression mode. Thus, the storage capacity of the compressed code storing portion can be reduced, whereby the storage capacity of the memory required for the program execution device can be reduced.

A program execution device according to another aspect of the present invention executes a program described in an object oriented language. The program is described by a code other than those native to the program execution device. The program execution device includes: a compressed code storing portion storing a code of the program which has been compressed on a method basis; an expanding portion connected to the compressed code storing portion for expanding the compressed code; a converting portion connected to the expanding portion for converting the expanded code to a native code; a native code storing portion connected to the converting portion for storing the native code output from the converting portion; and a native code executing portion connected to the native code storing portion for executing the native code.

The code of the method is compressed and stored in the compressed code storing portion. Thus, the storage capacity of the compressed code storing portion can be reduced, whereby the storage capacity of the memory required for the program execution device can be reduced.

A program execution device according to still another aspect of the present invention executes a program described in an object oriented language. The program execution device includes: a code storing portion storing a code of a method of the program; a native code storing portion storing a native code of the method; a compressed native code storing portion storing a compressed native code of the method; a first determining portion connected to the native code storing portion for determining if a native code of a desired method is stored in the native code storing portion; a second determining portion connected to the compressed native code storing portion for determining if a compressed native code of the desired method is stored in the compressed native code storing portion; a native code storage controlling portion connected to the first and second determining portions, compressed native code storing portion, code storing portion and native code storing portion for selectively executing expansion of the compressed native code stored in the compressed native code storing portion or conversion of the code stored in the code storing portion to a native code and storing the resultant native code in the native code storing portion in accordance with outputs from the first and second determining portions; a native code executing portion connected to the native code storing portion for executing the native code stored in the native code storing portion; and a native code compressing and storing portion connected to the second determining portion, native code storing portion and compressed native code storing portion for compressing the executed native code and storing it in the compressed native code storing portion in accordance with the output from the second determining portion.

The code is converted to the native code, and then compressed and stored in the compressed native code storing portion. Thus, the native code storing portion may have a smaller storage capacity as compared with the conventional device using the JIT.

Preferably, the program execution device includes a compression mode storing portion storing a compression mode of the compressed native code stored in the compressed native code storing portion on a method basis. The native code storage controlling portion is further connected to the compression mode storing portion for selectively executing expansion of the compressed native code stored in the compressed native code storing portion in accordance with the compression mode stored in the compression mode storing portion or conversion of the code stored in the code storing portion to the native code and storing the resultant native code in the native code storing portion in accordance with outputs from the first and second determining portions. The native code compressing and storing portion is further connected to the compression mode storing portion for compressing the executed native code by a compression mode specified by a predetermined mode, storing the compressed native code in the compressed native code storing portion, and storing the compression mode in the compression mode storing portion in accordance with the output from the second determining portion.

The native code is compressed in accordance with an optimum compression mode on a method basis. Thus, the compressed native code storing portion may have a smaller storage capacity.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram shown in conjunction with data stored in an RAM.

FIG. 7 is a diagram shown in conjunction with the data stored in the RAM.

FIG. 9 is a diagram shown in conjunction with the data stored in the RAM.

DESCRIPTION OF THE PREFERRED EMBODIMENTS

First Embodiment

A Java® virtual machine according to the first embodiment of the present invention is implemented with use of a built-in device.

Figure 1:
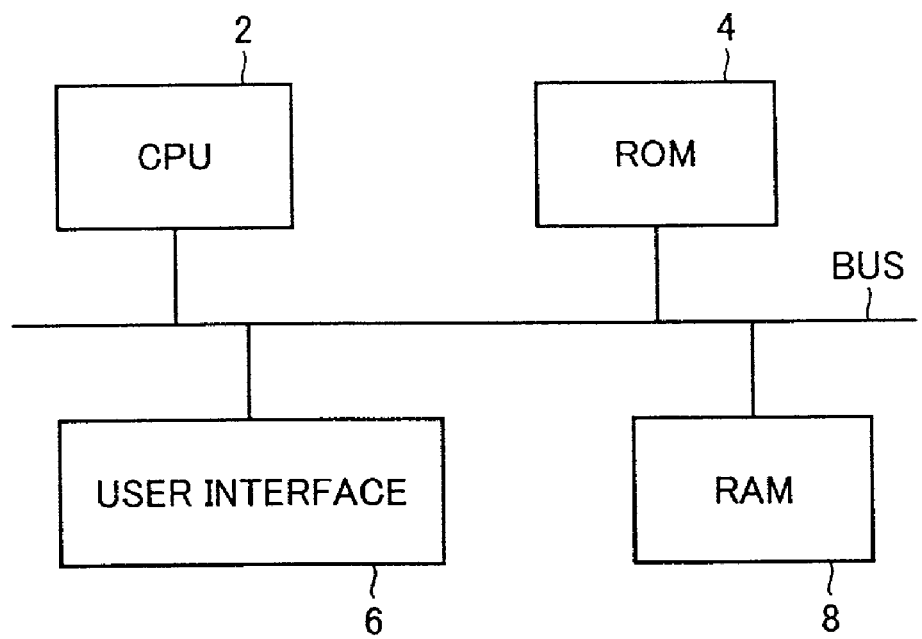
FIG. 1 is a block diagram showing a hardware structure of a built-in device according to an embodiment of the present invention.

Referring to FIG. 1, the built-in device includes: a CPU (Central Processing Unit) 2 interpreting and executing a program; an ROM (Read Only Memory) 4 storing a byte code of the program executed by CPU 2; an RAM (Random Access Memory) 8 storing various data used for execution of the program; a user interface 6 for inputting/outputting data with respect to the user; and a bus interconnecting CPU 2, ROM 4, user interface 6 and RAM 8.

Figure 2:
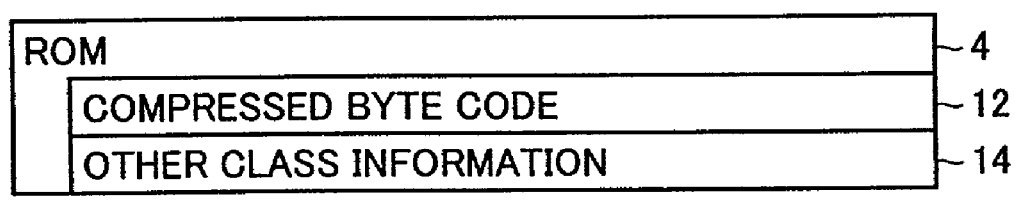
FIG. 2 is a diagram shown in conjunction with data stored in an ROM.

Referring to FIG. 2, ROM 4 has a compressed byte code storage region 12 for storing a byte code of the program described in the Java® language which has been compressed (hereinafter referred to as "compressed byte code"), and a region 14 for storing the other class information.

Referring to FIG. 3, RAM 8 includes: an operating system storage region 16 storing an operating system; a VM (Virtual Machine) module storage region 18 storing a VM module; a compression module storage region 24 for storing a compression module which is a program for compressing data; an expansion module storage region 26 for storing an expansion module which is a program for expanding the compressed data; a code storage region 28 for storing a byte code, native code and the like; and a method status storage region 36 for storing a method status representative of a status of a method. Method status storage region 36 is provided for every method.

VM module storage region 18 includes an interpreter storage region 20 for storing an interpreter, and a JIT storage region 22 for storing a JIT.

Code storage region 28 includes an expanded byte code storage region 30 for storing an expanded byte code, a native code storage region 32 for storing a native code, and a compressed native code storage region 34 storing a native code which has been compressed (hereinafter referred to as a "compressed native code").

Method status storage region 36 includes a frequency storage region 38 storing an execution frequency of the method, a size storage region 40 storing a size of the method, a native code presence flag storage region 42 storing a native code presence flag indicating if a native code is present, a compile time (order) storage region 44 storing a compiling time or order of the byte code, and a compression information storage region 46 storing information on compression.

Compression information storage region 46 includes a compression flag storage region 48 storing a compression flag indicating if the method has been compressed, an expansion flag storage region 50 storing an expansion flag indicating if the compressed method has been expanded, a compression mode storage region 52 storing a compression mode of the method, a compression ratio storage region 54 storing a compression ratio for compression, a compression time (order) storage region 56 storing a time or order of being compressed, and a compression size storage region 58 storing a size of the compressed native code.

Figure 4:
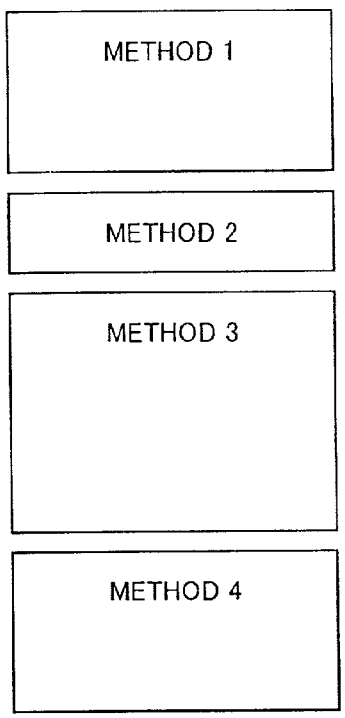
FIG. 4 is a diagram showing a program described in a Java® language.

Referring to FIG. 4, assume that the program described in the Java ® language is formed of four methods of 1 to 4 in the present embodiment. The program may be formed of any other number of methods.

All methods are individually compressed and stored in compressed byte code storage region 12.

Figure 5:
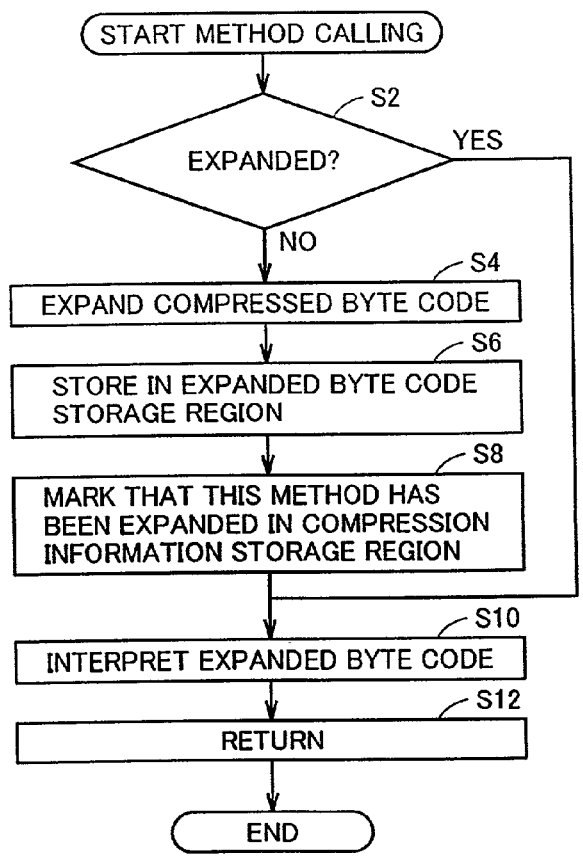
FIGS. 5 and 6 are flow charts showing a process when a method is called in a first embodiment.

Referring to FIG. 5, if a method is called by an upper module, CPU 2 refers to an expansion flag which is stored in expansion flag storage region 50 of the code method. Based on the expansion flag, CPU 2 determines if the byte code of the code method has been expanded and stored in expanded byte code storage region 30 (S2).

If the byte code has not been expanded (NO in S2), the byte code stored in compressed byte code storage region 12 is expanded (S4) and stored in expanded byte code storage region 30 (S6). Then, the value of the expansion flag is set to ON to indicate that the compressed byte code of the method has been expanded (S8).

After S8, or if the byte code of the method has been stored in expansion byte code storage region 30 (YES in S2), CPU 2 interprets and executes the expanded byte code on an instruction basis with use of an interpreter (S10). Thereafter, a process of returning to the module on the calling side is performed (S12).

Note that if the expanded byte code which has been written to expanded byte code storage region 30 is lost as a result of deletion or overwriting of the other byte code, for example, the expansion flag of the method corresponding to that byte code is set to OFF.

Figure 6:
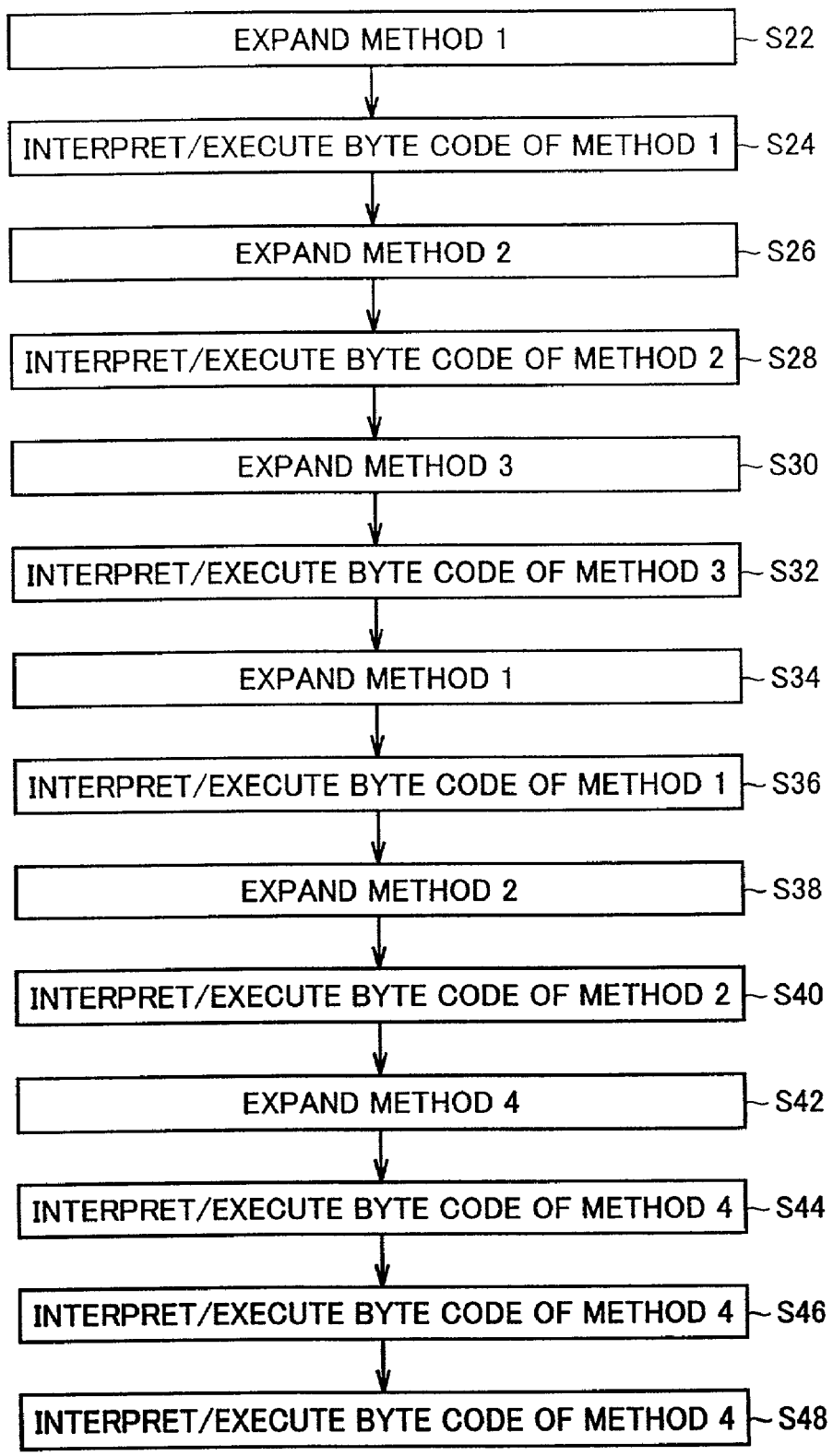

Assume that the above described four methods are sequentially called in the order of method 1, 2, 3, 1, 2, 4, 4 and 4 for execution. Further, assume that a byte code of only one method cannot be stored in expanded byte code storage region 30. Referring to FIG. 6, CPU 2 executes the process in the following way.

CPU 2 expands the compressed byte code of method 1 and sets the expansion flag to ON (S22). CPU 2 interprets and executes the byte code of method 1 on an instruction basis (S24). CPU 2 expands the compressed byte code of method 2 and sets the expansion flag to ON (S26). CPU 2 interprets and executes the byte code of method 2 on an instruction basis (S28). CPU 2 expands the compressed byte code of method 3 and sets the expansion flag to ON (S30). CPU 2 interprets and executes the byte code of method 3 on an instruction basis (S32). CPU 2 expands the compressed byte code of method 1 and sets the expansion flag to ON (S34). CPU 2 interprets and executes the byte code of method 1 on an instruction basis (S36).

CPU 2 expands the compressed byte code of method 2 and sets the expansion flag to ON (S38). CPU 2 interprets and executes the byte code of method 2 on an instruction basis (S40). CPU 2 expands the compressed byte code of method 4 and sets the expansion flag to ON (S42). CPU 2 interprets and executes the byte code of method 4 on an instruction basis (S44). Since the second method 4 has been expanded, CPU 2 interprets and executes the byte code of method 4 on an instruction basis (S46). Since the third method 4 has been expanded, CPU 2 interprets and executes the byte code of method 4 on an instruction basis (S48).

As described above, according to the present embodiment, the byte code is compressed and stored in the ROM. Thus, the storage capacity of the ROM can be reduced.

Second Embodiment

Unlike the first embodiment, in the present embodiment, the byte code is compressed on a reference block basis rather than on a method basis. The reference block refers to a series of instructions not containing branching instructions.

A Java® virtual machine of the present embodiment is implemented with use of the built-in device described with reference to FIG. 1. Thus, the detailed description thereof will not be repeated here.

The information stored in ROM 4 is the same as that described with reference to FIG. 2. Thus, the detailed description thereof will not be repeated here.

Note that a byte code is compressed and stored in compressed byte code storage region 12 on a reference block basis.

Referring to FIG. 7, RAM 8 includes an operating system storage region 16 storing an operating system, a VM module storage region 18 storing a VM module, a compression module storage region 24 for storing a compression module which is a program for compressing data, an expansion module storage region 26 for storing an expansion module which is a program for expanding the compressed data, a code storage region 28 for storing a byte code, native code and the like, and a reference block status storage region 60 for storing a reference block status representative of the status of the reference block. Reference block status storage region 60 is provided for every reference block.

Reference block status storage region 60 includes a frequency storage region 62 storing the execution frequency of the reference block, a size storage region 64 storing the size of the reference block, a native code presence flag storage region 66 storing a native code presence flag indicating if a native code is present, a compiling time (order) storage region 68 storing the compiling time or order of the byte code, and a compression information storage region 70 storing information on compression.

Compression information storage region 70 includes a compression flag storage region 72 storing a compression flag indicating if the reference block has been compressed, an expansion flag storage region 74 storing an expansion flag indicating if the compressed reference block has been expanded, a compression mode storage region 76 storing the compression mode of the reference block, a compression ratio storage region 78 storing a compression ratio for compression, a compression time (order) storage region 80 storing the time or order of compression, and a compression size storage region 82 storing the size of the compressed native code.

Figure 8:
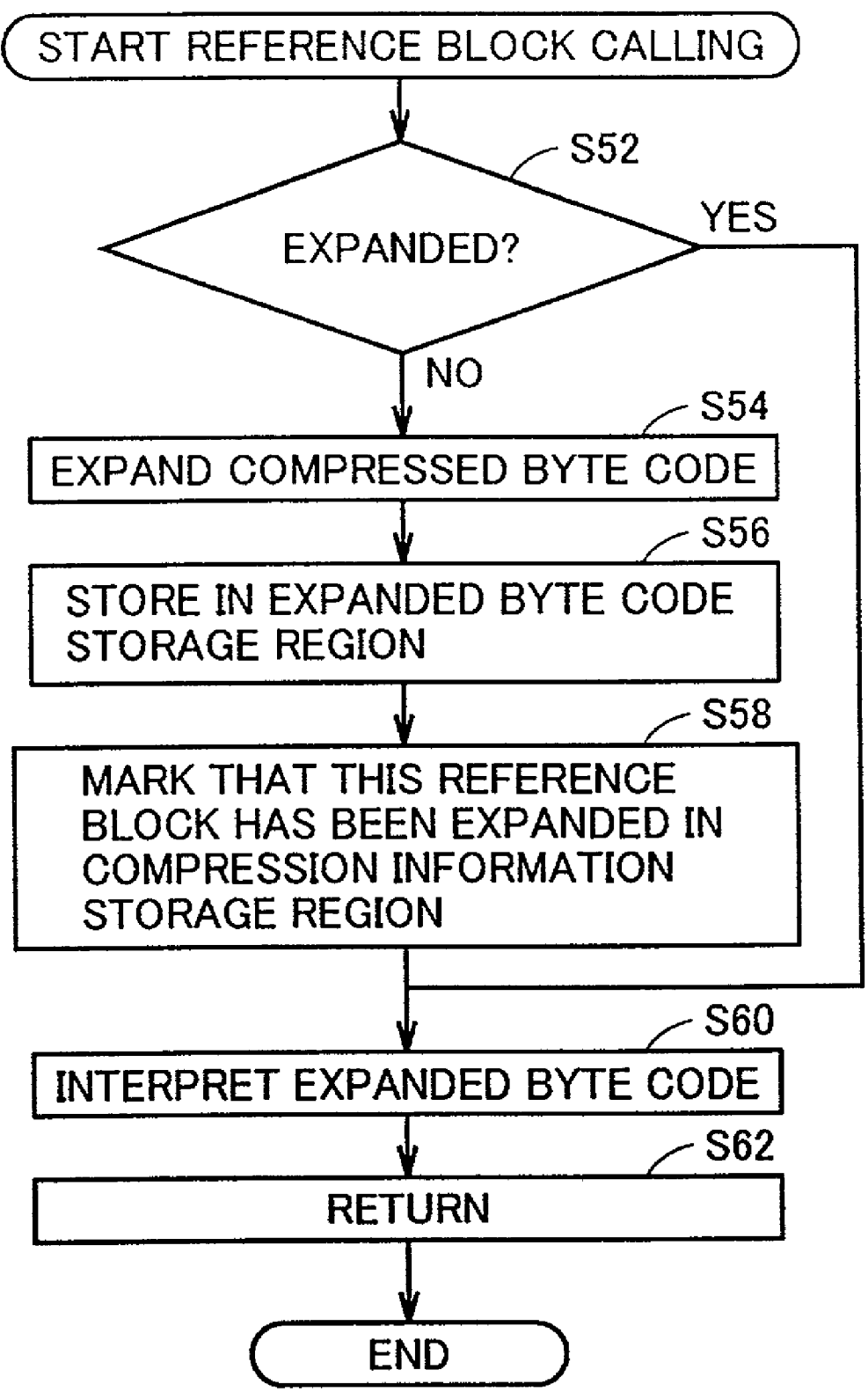
FIG. 8 is a flow chart showing a process when a reference block is called in a second embodiment.

Referring to FIG. 8, when the reference block is called by an upper module, CPU 2 refers to an expansion flag which is stored in expansion flag storage region 74 of the called reference block. CPU 2 determines if the byte code of the called reference block has been expanded and stored in expanded byte code storage region 30 based on the expansion flag (S52).

If the byte code has not been expanded (NO in S52), the byte code stored in compressed byte code storage region 12 is expanded (S54) and the expanded byte code is stored in expanded byte code storage region 30 (S56). Thereafter, the value of the expansion flag is set to ON to indicate that the byte code of the reference block has been expanded (S58).

After S58, or when the byte code of the reference block has been stored in expanded byte code storage region 30 (YES in S52), CPU 2 interprets and executes the expanded byte code on an instruction basis with use of an interpreter (S60). Thereafter, a process of returning to the module on the calling side is performed (S62).

Note that if the expanded byte code which has been written to expanded byte code storage region 30 is lost as a result of deletion or overwriting the other byte code, the expansion flag of the reference flag corresponding to that byte code is set to OFF.

As described above, according to the present embodiment, the byte code is compressed and stored in the ROM. Thus, the storage capacity of the ROM can be reduced.

In addition, the expanded byte code of the compressed byte code of the reference block is stored in the expanded byte code storage region. Thus, as compared with the first embodiment, the storage capacity of the expanded byte code storage region may be smaller, whereby the storage capacity of the RAM can be reduced.

Third Embodiment

Unlike the first embodiment, in the present embodiment, a byte code is compressed on an instruction basis rather than on a method basis.

A Java® virtual machine according to the present embodiment is implemented with use of the built-in device which has been described with reference to FIG. 1. Thus, the detailed description thereof will not be repeated here.

In addition, the information stored in RAM 4 is the same as in the case of FIG. 2. Thus, the detailed description thereof will not be repeated here.

Note that a byte code is compressed and stored in compressed byte code storage region 12 on an instruction basis.

Referring to FIG. 9, RAM 8 includes an operating system storage region 16 storing an operating system, a VM module storage region 18 storing a VM module, a compression module storage region 24 for storing a compression module which is a program for compressing data, an expansion module storage region 26 for storing an expansion module which is a program for expanding the compressed data, a code storage region 28 for storing a byte code, native code and the like, and an instruction status storage region 90 for storing an instruction status representative of the status of the instruction. Instruction status storage region 90 is provided for every instruction.

Instruction status storage region 90 includes a frequency storage region 92 storing an execution frequency of an instruction, a size storage region 94 storing the size of the instruction, a native code presence flag storage region 96 storing a native code presence flag indicating if a native code is present, a compiling time (order) storage region 98 storing a compiling time or order of the byte code, and a compression information storage region 100 storing information on compression.

Compression information storage region 100 includes a compression flag storage region 102 storing a compression flag indicating if the instruction has been compressed, an expansion flag storage region 104 storing an expansion flag indicating if the compressed instruction has been expanded, a compression mode storage region 106 storing the compression mode of the instruction, a compression ratio storage region 108 storing a compression ratio for compression, a compression time (order) storage region 110 storing a compression time or order, and a compression size storage region 112 storing the size of the compressed native code.

Figure 10:
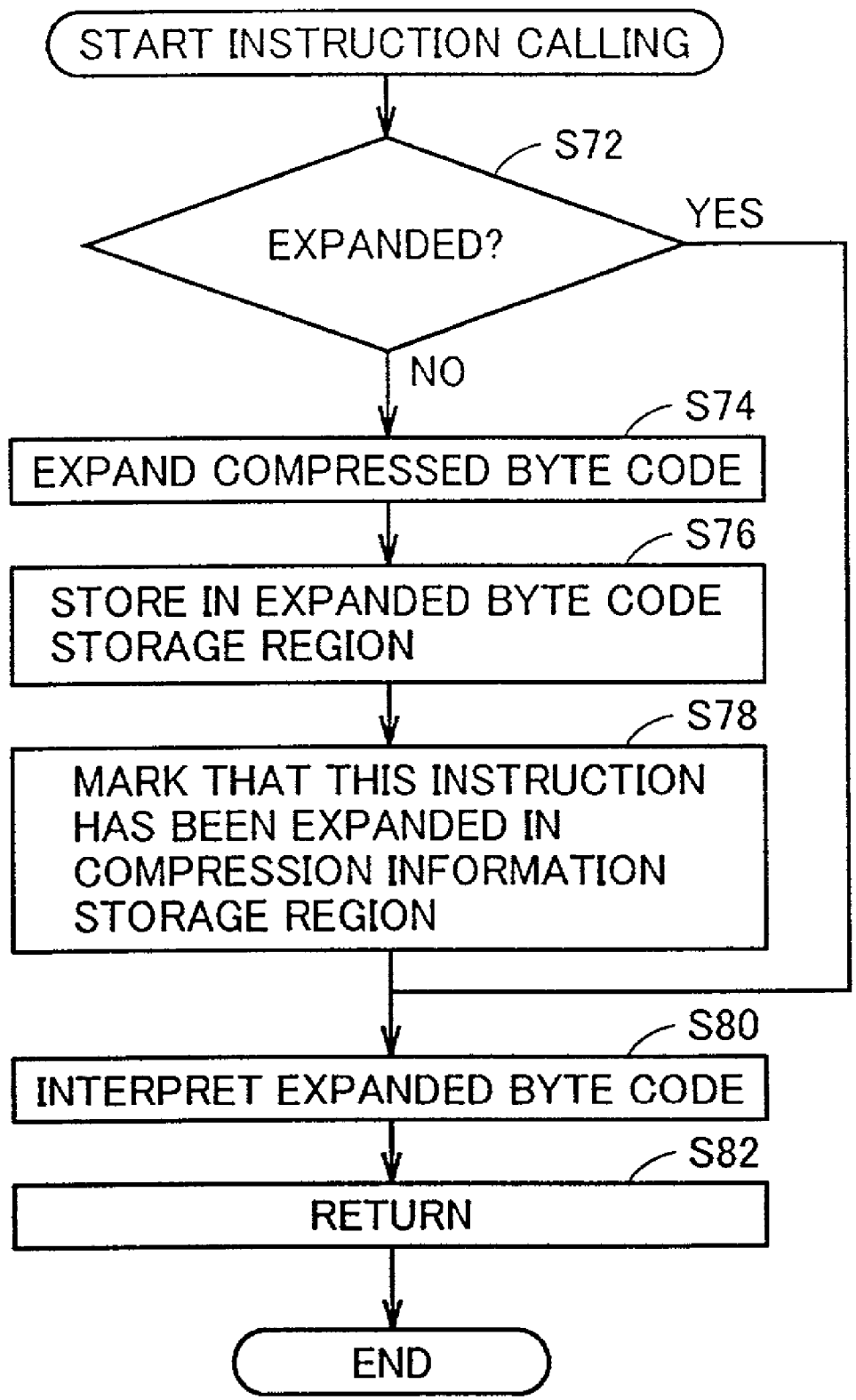
FIG. 10 is a flow chart showing a process when an instruction is called in a third embodiment.

Referring to FIG. 10, if an instruction is called by an upper module, CPU 2 refers to the expansion flag stored in expansion flag storage region 104 of the called instruction. CPU 2 determines if the byte code of the called instruction has been expanded and stored in expanded byte code storage region 30 based on the expansion flag (S72).

If the byte code has not been expanded (NO in S72), the byte code stored in compressed byte code storage region 12 is expanded (S74) and the expanded byte code is stored in expanded byte code storage region 30 (S76). Thereafter, the value of the expansion flag is set to ON to indicate that the byte code of the instruction has been expanded (S78).

After S78, or if the byte code of the instruction is stored in expanded byte code storage region 30 (YES in S72), CPU 2 interprets and executes the expanded byte code with use of an interpreter (S80). Thereafter, a process of returning to the module on the calling side is performed (S82).

Note that if the expanded byte code written in expanded byte code storage region 30 is lost as a result of deletion or overwriting of the other byte code, for example, the expansion flag of the instruction corresponding to that byte code is set to OFF.

As described above, in the present embodiment, the byte code is compressed and stored in the ROM. Thus, the storage capacity of the ROM can be reduced.

A byte code obtained by expanding the compressed byte code of the instruction is stored in the expanded byte code storage region. Thus, as compared with the first and second embodiments, the storage capacity of the expanded byte code storage region may be smaller, whereby the storage capacity of the RAM can be reduced.

Fourth Embodiment

In the present embodiment, a plurality of compression modes are supported as a compression mode of a compressed byte code stored in a compressed byte code storage region.

A Java® virtual machine of the present embodiment is implemented with use of the built-in device described with reference to FIG. 1. Thus, the detailed description thereof will not be repeated here.

The information stored in ROM 4 and RAM 8 are the same as those described with reference to FIGS. 2 and 3. Thus, the detailed description thereof will not be repeated here.

Note that a byte code is compressed and stored in compressed byte code storage region 12 on a method basis.

Figure 11:
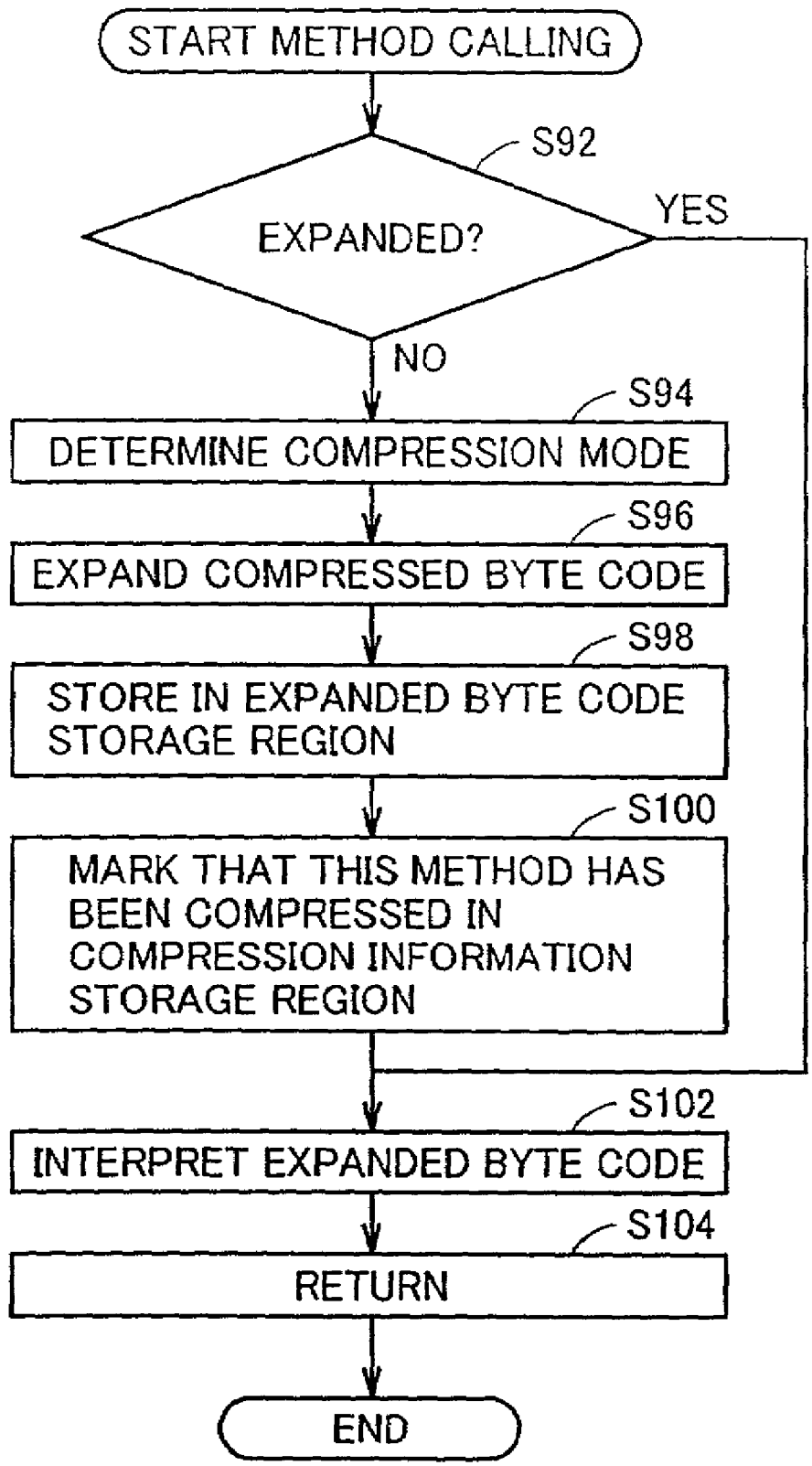
FIG. 11 is a flow chart showing a process when a method is called in a fourth embodiment.

Referring to FIG. 11, when a method is called by an upper module, CPU 2 refers to an expansion flag stored in an expansion flag storage region 50 of the called method. CPU 2 determines if the byte code of the called method has been expanded and stored in expanded byte code storage region 30 based on the expansion flag (S92).

If the byte code has not been stored (NO in S92), a compression mode of the byte code stored in compressed byte code storage region 12 is determined (S94). The compression mode is determined by making reference to a header portion of the compressed byte code. The byte code stored in compressed byte code storage region 12 is expanded according to the compression mode determined in S94 (S96), the expanded byte code is stored in expanded byte code storage region 30 (S98). Then, the value of the expansion flag is set to ON to indicate that the byte code of the method has been expanded (S100).

After S100, or if the byte code of the method is stored in expanded byte code storage region 30 (YES in S92), CPU 2 interprets and executes the expanded byte code on an instruction basis with use of an interpreter (S 102). Thereafter, a process of returning to the module on the calling side is performed (S104).

Note that if the expanded byte code written to expanded byte code storage region 30 is lost as a result of deletion or overwriting of the other byte code, for example, the expansion flag of the method corresponding to that byte code is set to OFF.

As described above, in the present embodiment, the byte code is compressed and stored in the ROM. Thus, the storage capacity of the ROM can be reduced.

In addition, a user can select a compression mode for every method to employ an optimum compression mode. Thus, the storage capacity of the ROM can be reduced.

Fifth Embodiment

In the present embodiment, a JIT is used to expand a compressed byte code to be compiled into a native code for execution.

A Java® virtual machine of the present embodiment is implemented with use of the built-in device described with reference to FIG. 1. Thus, the detailed description thereof will not be repeated here.

The information stored in ROM 4 and RAM 8 are the same as those of FIGS. 2 and 3. Thus, the detailed description thereof will not be repeated here.

Note that a byte code is compressed and stored on a method basis in compressed byte code storage region 12.

Figure 12:
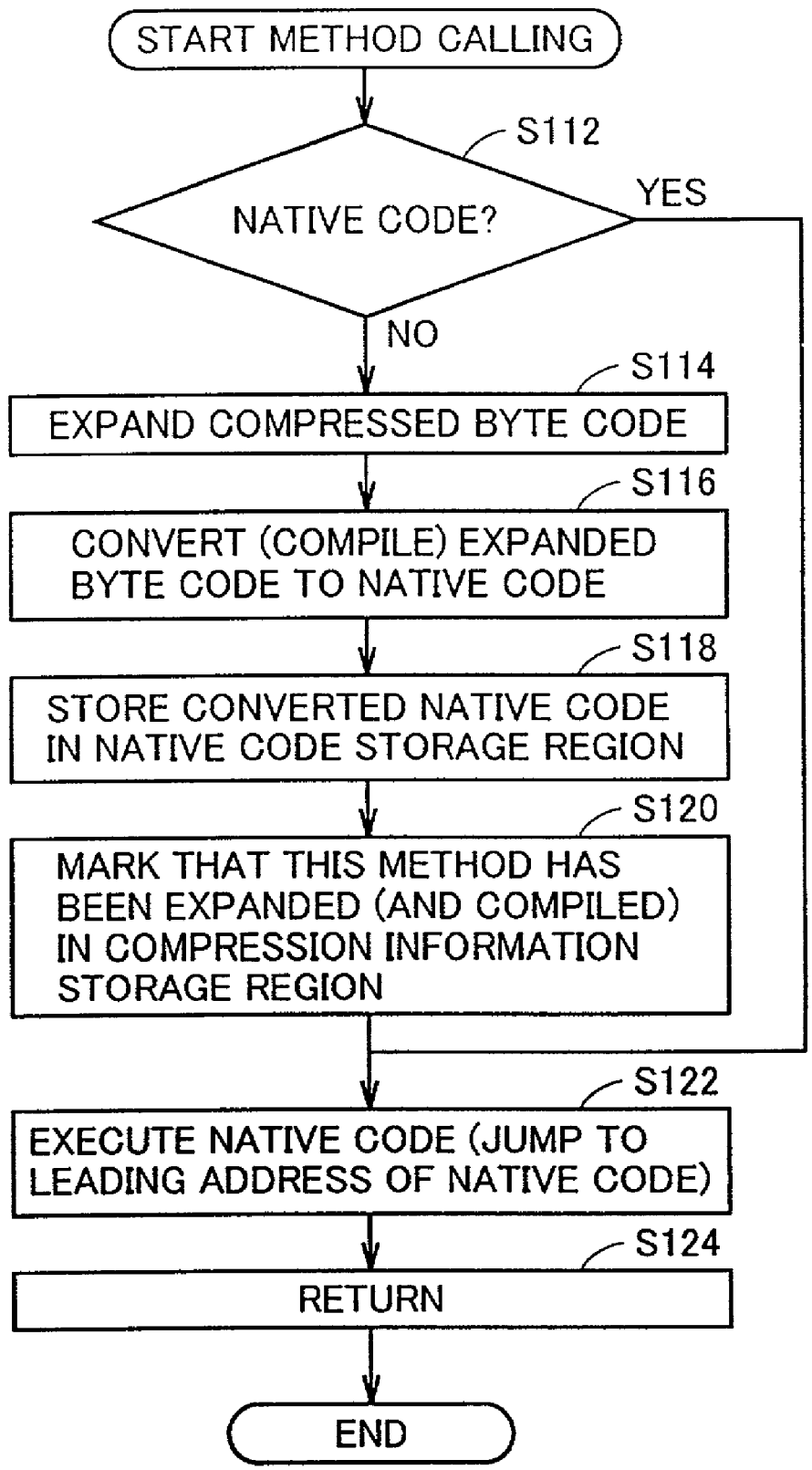
FIGS. 12 and 13 are flow charts showing a process when a method is called in a fifth embodiment.

Referring to FIG. 12, when a method is called by an upper module, CPU 2 refers to an expansion flag stored in expansion flag storage region 50 of the called method and determines if the byte code of the called method has been expanded, converted to a native code and stored in a native code storage region 32 (S112).

If the byte code has not been expanded (NO in S112), the byte code stored in compressed byte code storage region 12 is expanded (S114). The expanded byte code is compiled by the JIT stored in JIT storage region 22 and converted to a native code (S116). The native code is stored in native code storage region 32 (S118). The value of the expansion flag is set to ON to indicate that the compressed byte code of the method has been expanded and compiled (S120).

After S120, or if the native code of the method is stored in native code storage region 32 (YES in S112), CPU 2 sets the value of a program counter to the leading address of the native code and executes the native code (S122). Thereafter, a process of returning to the module on the calling side is performed (S124).

Note that if the native code stored a native code storage region 32 is lost as a result of deletion or overwriting of the other native code, for example, the expansion flag of the method corresponding to that native code is set to OFF.

Figure 13:
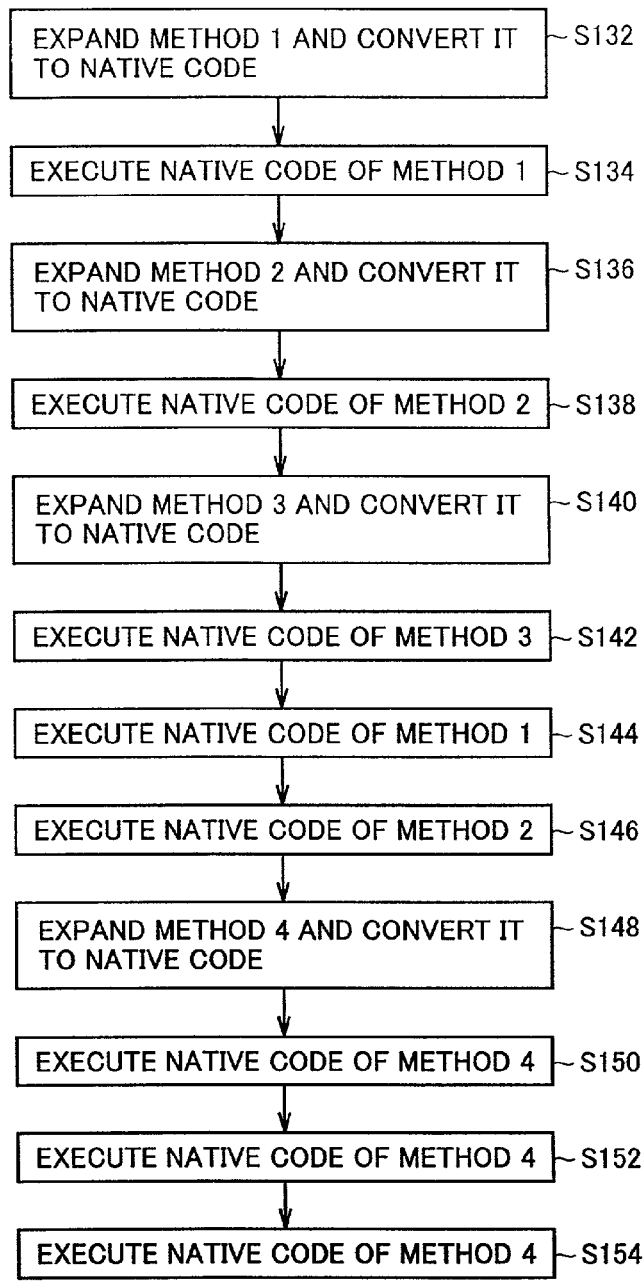

Referring to FIG. 4, assume that the program described in the Java (R) language is formed of four methods 1 to 4. Further, assume that methods are sequentially called for execution in the order of method 1, 2, 3, 1, 2, 4, 4 and 4. Note that the native codes of four methods can be collectively stored in native code storage region 32. Based on the above, the process will be performed by CPU 2 in the following way, with reference to FIG. 13.

CPU 2 expands the compressed byte code of method 1, converts the expanded byte code to a native code and sets the expansion flag to ON (S132). The native code of method 1 is executed on an instruction basis (S134).

CPU 2 expands the compressed byte code of method 2, converts the expanded byte code to a native code, and sets the expansion flag to ON (S136). The native code of method 2 is executed on an instruction basis (S138).

CPU 2 expands the compressed byte code of method 3, converts the expanded byte code to a native code, and sets the expansion flag to ON (S140). The native code of method 3 is executed on an instruction basis (S142).

The native code of method 1 is executed on an instruction basis (S144). The native code of method 2 is executed on an instruction basis (S146).

CPU 2 expands the compressed byte code of method 4, converts the expanded byte code to a native code, and sets the expansion flag to ON (S148). The native code of method 4 is executed on an instruction basis (S150). The native code of method 4 is executed on an instruction basis (S152). The native code of method 4 is executed on an instruction basis (S154).

As described above, in the present embodiment, the byte code is compressed and stored in the ROM. Thus, the storage capacity of the ROM can be reduced.

Note that native code storage region 32 may be provided in a cache memory (not shown) arranged between CPU 2 and RAM 8. This provides for higher execution speed.

Sixth Embodiment

In the present embodiment, a JIT is used to compile a byte code into a native code for execution. At the time, any unnecessary native code is compressed and stored.

A Java® virtual machine of the present embodiment is implemented with use of the built-in device described with reference to FIG. 1. Thus, the detailed description thereof will not be repeated here.

In addition, the information stored in RAM 8 is the same as that of FIG. 3. Thus, the detailed description thereof will not be repeated here.

Figure 14:
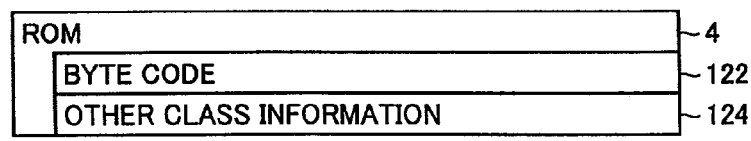
FIG. 14 is a diagram shown in conjunction with data stored in an ROM.

Referring to FIG. 14, ROM 4 includes a byte code storage region 122 storing a byte code of a program described in the Java® language, and a region 124 storing the other class information.

Figure 15:
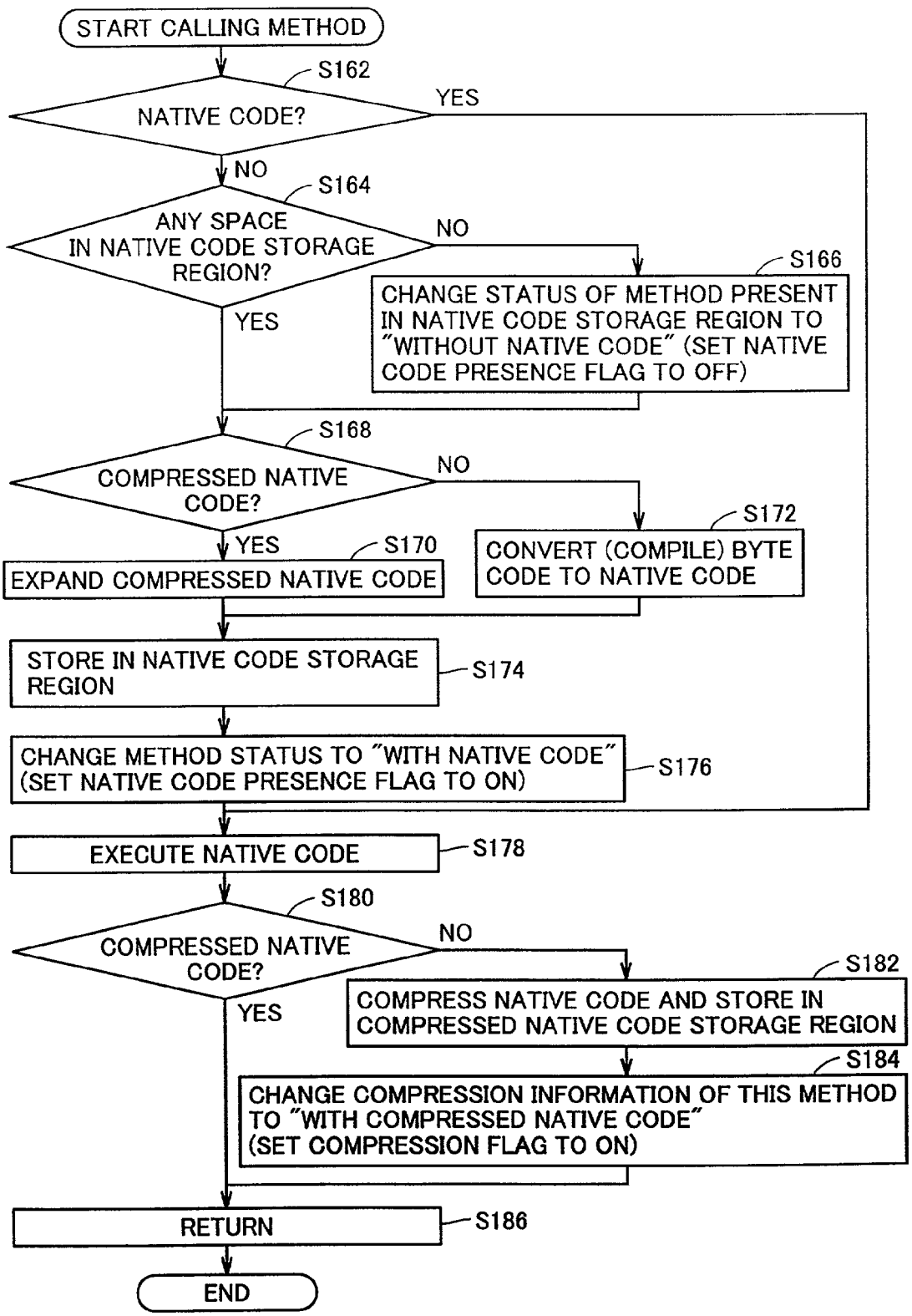
FIGS. 15 and 16 are flow charts showing a process when a method is called in a sixth embodiment.

Referring to FIG. 15, when a method is called by an upper module, CPU 2 refers to a native code presence flag of that method stored in a native code presence flag storage region 42. CPU 2 determines if the called native code is stored in native code storage region 32 based on the native code presence flag (S162).

If the native code is not stored in native code storage region 32 (NO in S162), CPU 2 determines if there is any space available to an additional native code in native code storage region 32 (S164).

If there is no more space in native code storage region 32 (NO in S164), CPU 2 sets the native code presence flag of the method present in native code storage region 32 to OFF to make a space available in native code storage region 32 (S166).

If there is a space in native code storage region 32 (YES in S164) or if a space is made in native code storage region 32 (S166), CPU 2 determines if the compressed native code of the called method is stored in compressed native code storage region 34 (S168). Namely, CPU 2 determines if the compression flag stored in compression flag storage region 48 of that method is ON.

If the compressed native code of the called method is stored in compressed native code storage region 34 (YES in S168), CPU 2 expands the compressed native code (S170) and stores it in native code storage region 32 (S174).

If the compressed native code of the code method is not stored in compressed native code storage region 34, CPU 2 reads out the byte code of that method from byte code storage region 122 of ROM 4, converts it to a native code (S172), and stores it in native code storage region 32 (S174).

After S174, CPU 2 sets the native code presence flag of the called method to ON. After S176, or if the native code of the called method is stored in native code storage region 32 (YES in S162), CPU 2 executes the native code (S178).

A determination is made as to if the compressed native code of the called method is stored in compressed native code storage region 34 (S180). If the compressed native code is not stored in compressed native code storage region 34, CPU 2 compresses the native code of the called method that is stored in native code storage region 32, and stores it in compressed native code storage region 34 (S182). Further, CPU 2 sets the compression flag of the method stored in compression flag storage region 48 to ON (S184).

If the compressed native code is stored in compressed native code storage region 34 (YES in S180), or if it is stored in compressed native code storage region 34 (S184), CPU 2 performs a process of returning to the module on the calling side (S186).

Referring to FIG. 4, assume that the program described in the Java® language is formed of four methods 1 to 4, which are sequentially called for execution in the order of 1, 2, 3, 1, 2, 4, 4 and 4.

Further, assume that a native code of no more than one method is stored in native code storage region 32, whereas the compressed native codes of all methods can be stored in compressed native code storage region 34.

Figure 16:
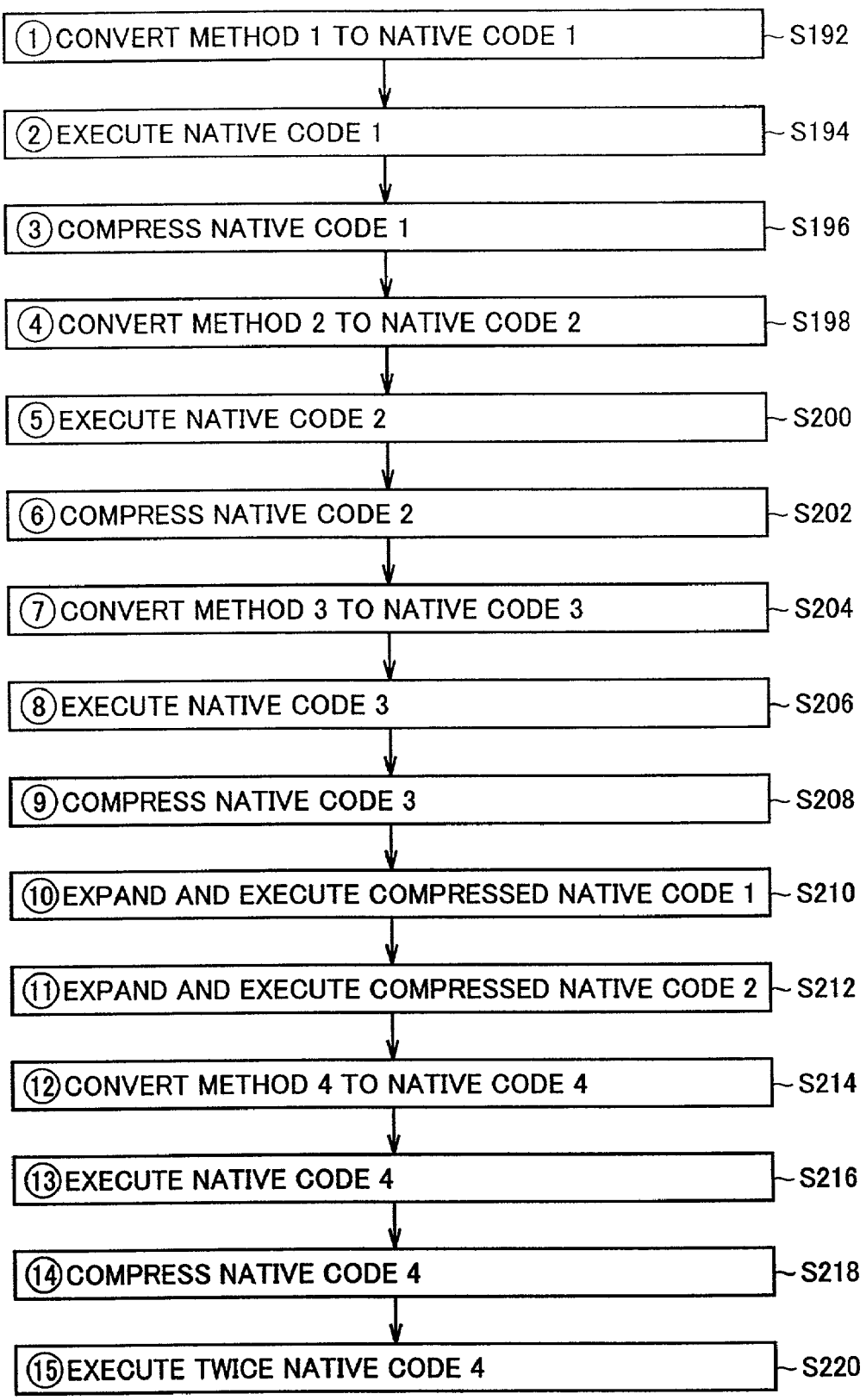
Figure 17:
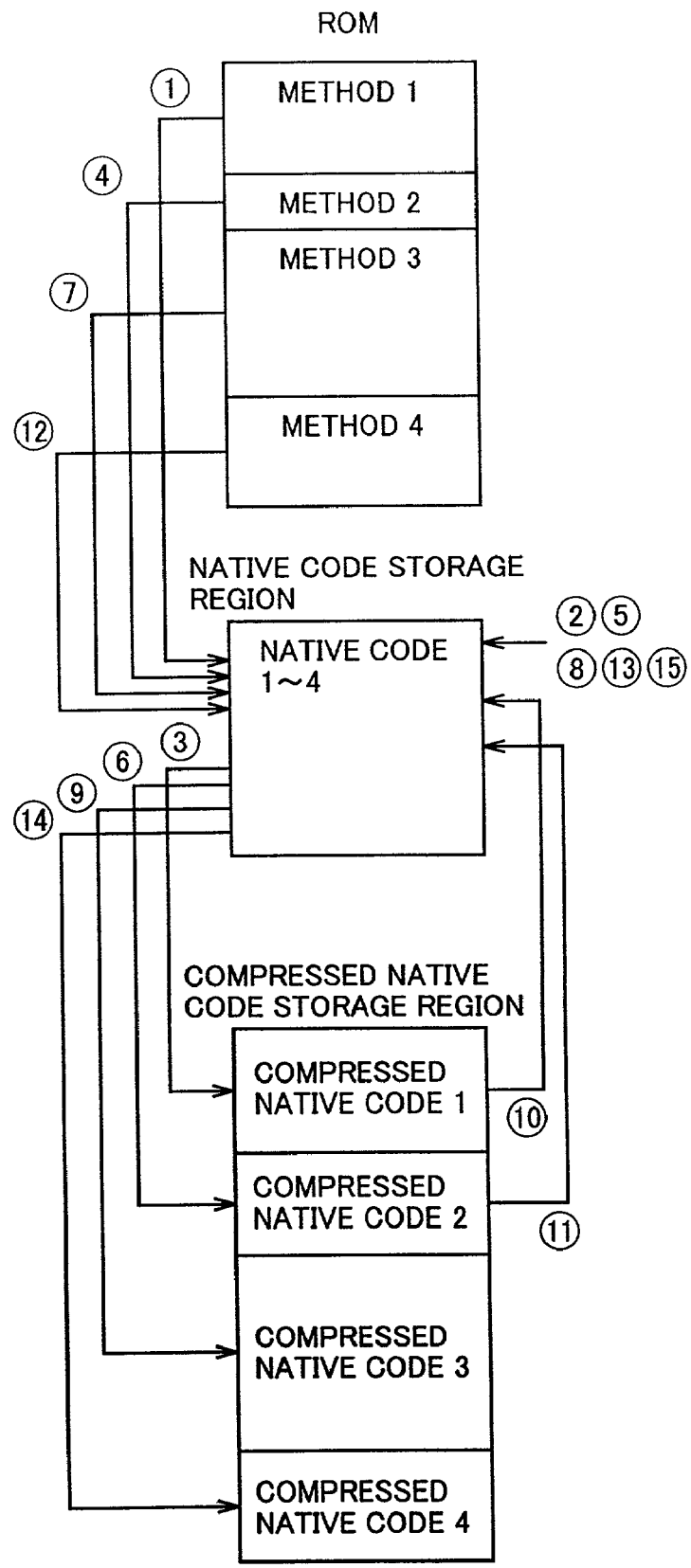
FIG. 17 is a diagram shown in conjunction with a process when a method is called in the sixth embodiment.

Then, referring to FIGS. 16 and 17, CPU 2 performs a process in the following way.

CPU 2 converts method 1 to native code 1 for storage in native code storage region 32 (S192). CPU 2 executes native code 1 (S194). CPU 2 compresses a native code 1 and stores it in compressed native code storage region 34 (S196).

CPU 2 converts method 2 to native code 2 for storage in native code storage region 32 (S198). CPU 2 executes native code 2 (S200). CPU 2 compresses native code 2 for storage in compressed native code storage region 34 (S202).

CPU 2 converts method 3 to native code 3 for storage in native code storage region 32 (S204). CPU 2 executes native code 3 (S206). CPU 2 compresses native code 3 for storage in compressed native code storage region 34 (S208).

CPU 2 expands the compressed native code of method 1 stored in compressed native code storage region 34 for execution (S210). CPU 2 expands and executes the compressed native code of method 2 stored in compressed native code storage region 34 (S212).

CPU 2 converts method 4 to native code 4 for storage in native code storage region 32 (S214). CPU 2 executes native code 4 (S216). CPU 2 compresses native code 4 for storage in compressed native code storage region 34 (S218). CPU 2 consecutively executes native code 4 stored in native code storage region 32 twice (S220).

As described above, in the present embodiment, the byte code is converted to a native code for compression and storage. Thus, as compared with the conventional Java® VM using a JIT, the storage capacity of the RAM can be reduced.

Seventh Embodiment

Unlike the sixth embodiment, in the present embodiment, several compression modes are available as a compression mode for compressing a native code.

A Java® virtual machine of the present embodiment is implemented with use of the built-in device described with reference to FIG. 1. Thus, the detailed description thereof will not be repeated here.

In addition, the information stored in RAM 8 is the same as in the case of FIG. 3. Thus, the detailed description thereof will not be repeated here.

Further, the information stored in ROM 4 is the same as in the case of FIG. 14. Thus, the detailed description thereof will not be repeated here.

Figure 18:
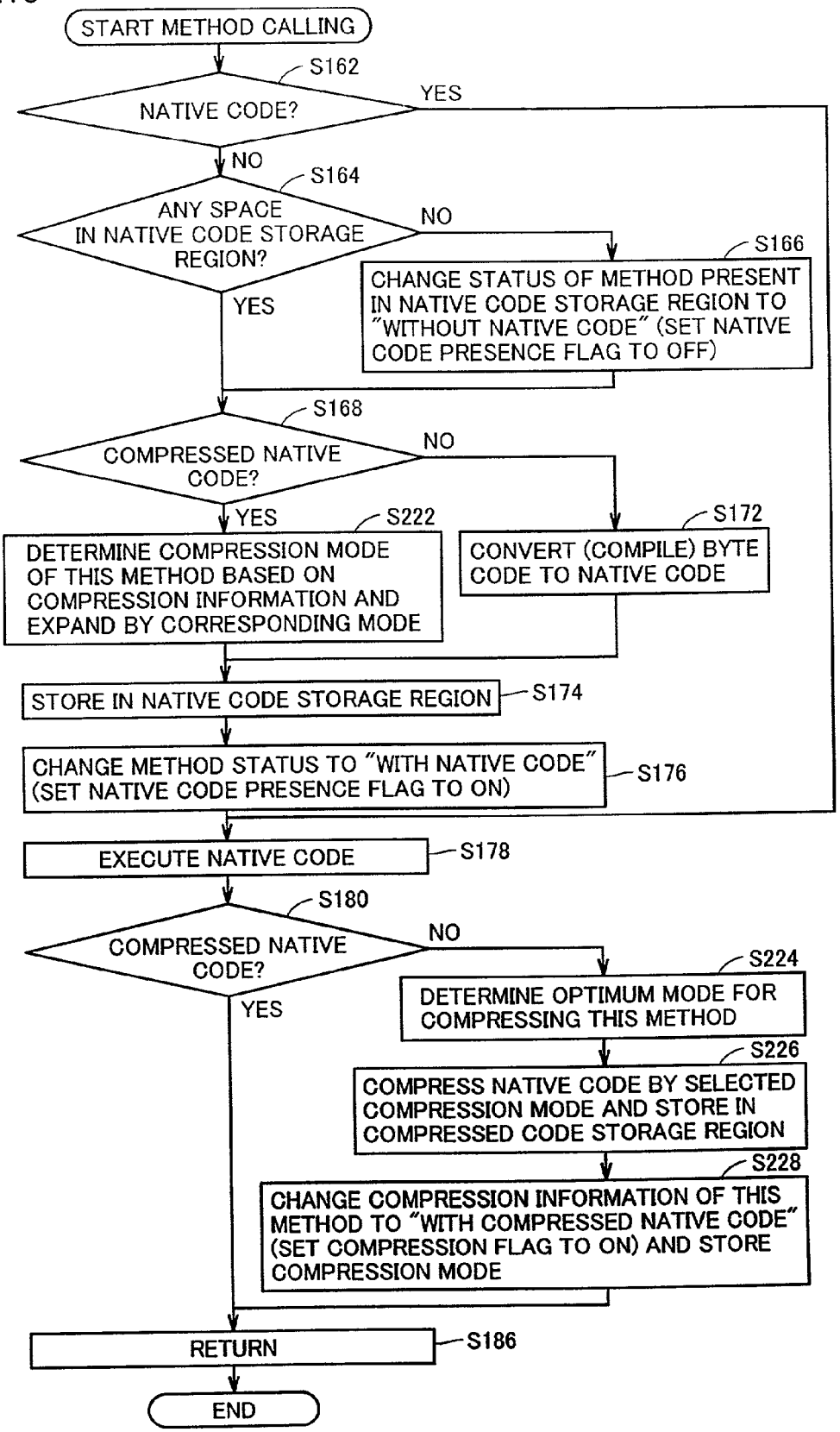
FIGS. 18 to 20 are flow charts showing a process when a method is called in a seventh embodiment.

Referring to FIG. 18, a process of CPU 2 when a method is called by an upper module will be described. The process of CPU 2 corresponds to S222 in place of S170, and corresponds to S224–S228 in place of S182 and S184 of the process of FIG. 15.

In S222, CPU 2 expands the called method. Namely, CPU 2 determines the compression mode based on the value stored in compression mode storage region 52 and expands the native code of the method in accordance with that compression mode.

In S224, CPU 2 determines an optimum mode for compressing the native code of the called method. In S226, CPU 2 compresses the native code in the selected compression mode and stores it in compressed native code storage region 34. In S228, CPU 2 sets the compression flag of the method stored in compression flag storage region 48 to ON and stores the compression mode in compression mode storage region 52.

Referring to FIG. 4, assume that a program described in the Java® language is formed of four methods 1 to 4, which are sequentially called for execution in the order of methods 1, 2, 3, 1, 2, 4, 4, and 4.

Note that a native code of no more than one method is stored in native code storage region 32, whereas the compressed native codes of all methods can be stored in compressed native code storage region 34.

Further, assume that there are two types of compression modes A and B, where compression mode A is suitable for compressing the native code of method 1 and compression mode B is suitable for compressing the native codes of methods 2 to 4.

Figure 19:
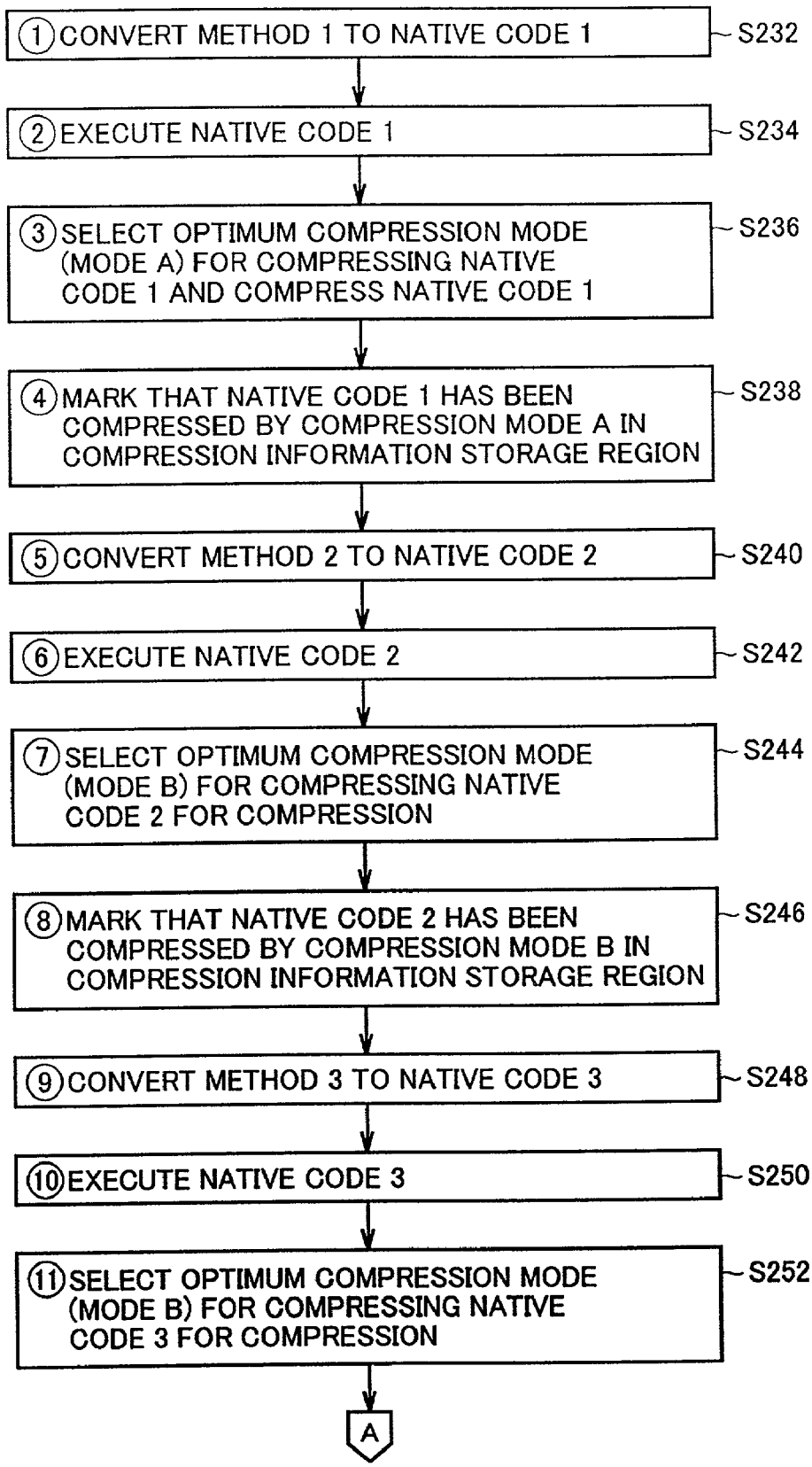
Figure 20:
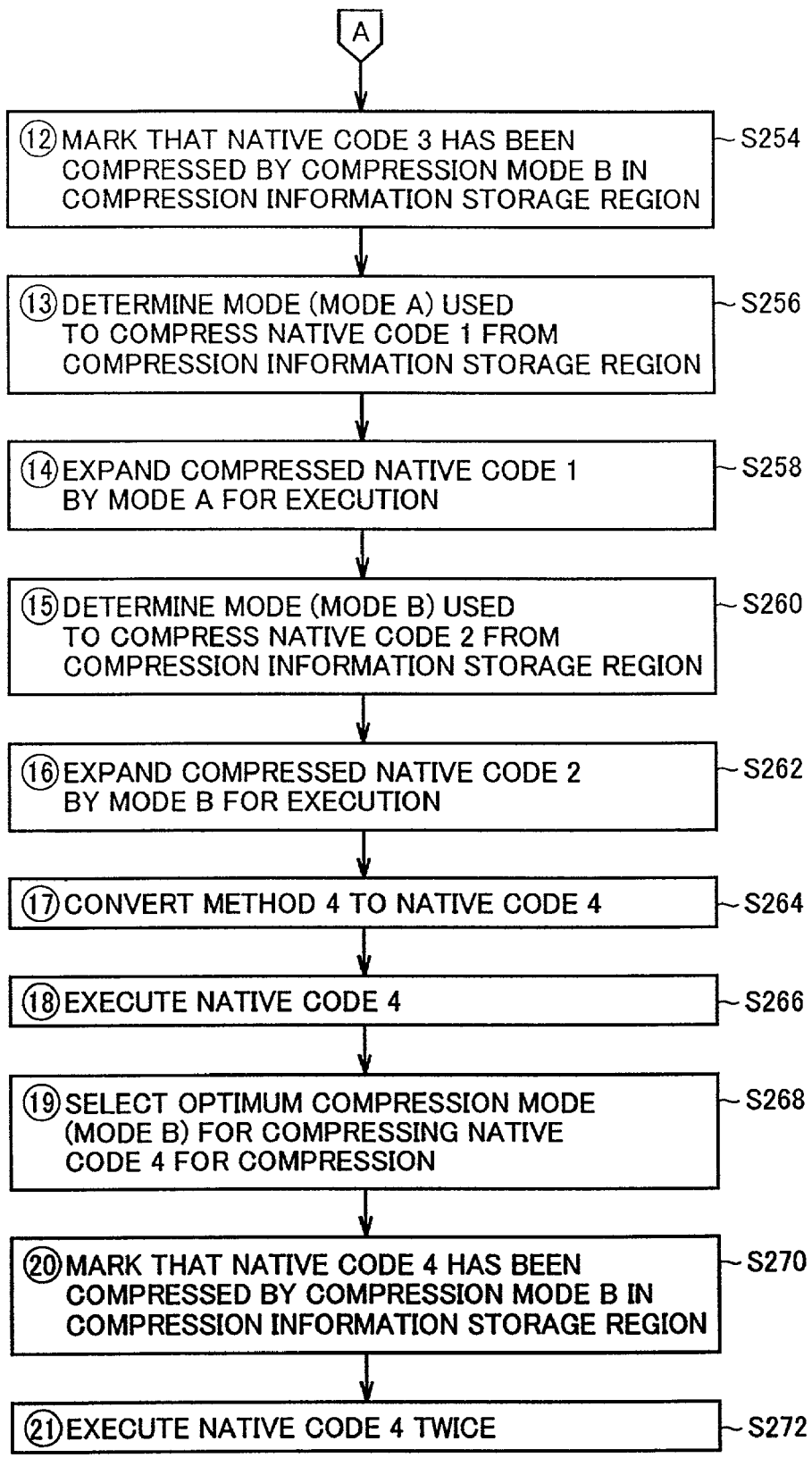
Figure 21:
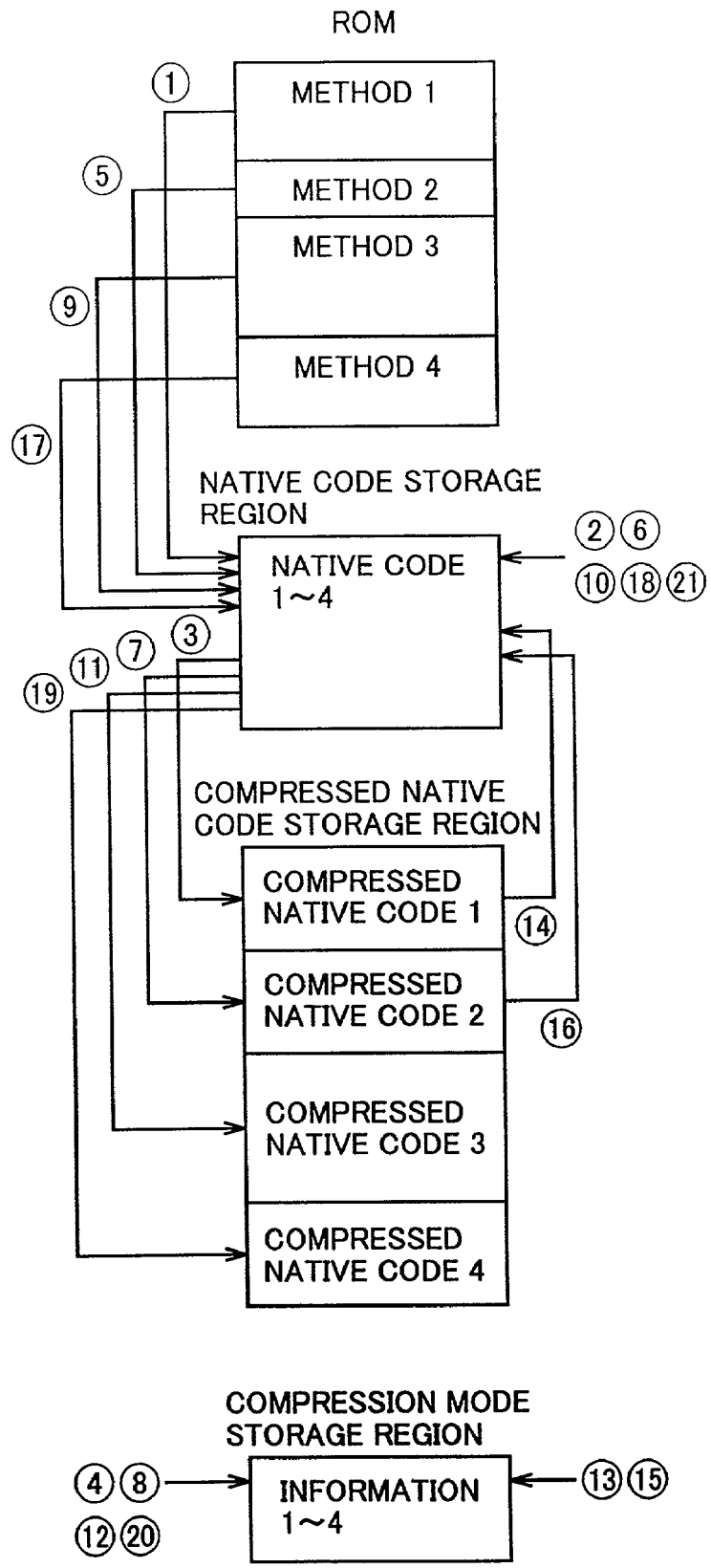
FIG. 21 is a diagram shown in conjunction with a process when a method is called in the seventh embodiment.

Then, referring to FIGS. 19, 20 and 21, CPU 2 performs a process in the following way.

CPU 2 converts method 1 to native code 1 for storage in native code storage region 32 (S232). CPU 2 executes native code 1 (S234). CPU 2 selects compression mode A suitable for compressing native code 1 and compresses native code 1 for storage in compressed native code storage region 34 (S236). CPU 2 stores the fact that native code 1 has been compressed by compression mode A in compression mode storage region 52 (S238).

CPU 2 converts method 2 to native code 2 for storage in native code storage region 32 (S240). CPU 2 executes native code 2 (S242). CPU 2 selects compression mode B which is most suitable for compressing the native code 2 and compresses native code 2 for storage in compressed native code storage region 34 (S244). CPU 2 stores the fact that native code 2 has been compressed by compression mode B in compression mode storage region 52 (S246).

CPU 2 converts method 3 to native code 3 for storage in native code storage region 32 (S248). CPU 2 executes native code 3 (S250). CPU 2 selects compression mode B which is most suitable for compressing native code 3 and compresses native code 3 for storage in compressed native code storage region 34 (S252). CPU 2 stores the fact that native code 3 has been compressed by compression mode B in compression mode storage region 52 (S254).

CPU 2 determines the compression mode of the compressed native code of method 1 stored in compressed native code storage region 34 based on the value stored in compression mode storage region 52 (S256). As a result, it is found that the employed compression mode is A. CPU 2 expands the compressed native code of method 1 stored in compressed native code storage region 34 in the mode corresponding to compression mode A for execution (S258).

CPU 2 determines the compression mode of the compressed native code of method 2 stored in compressed native code storage region 34 based on the value stored in compression mode storage region 52 (S260). As a result, it is found that the compression mode is B. CPU 2 expands the compressed native code of method 2 stored in compressed native code storage region 34 in the mode corresponding to compression mode B for execution (S262).

CPU 2 converts method 4 to native code 4 for storage in native code storage region 32 (S264). CPU 2 executes native code 4 (S266). CPU 2 selects compression mode B which is most suitable for compressing native code 4 and compresses native code 4 for storage in compressed native code storage region 34 (S268). CPU 2 stores the fact that native code 4 has been compressed by compression mode B in compression mode storage region 52 (S270). CPU 2 consecutively executes native code 4 stored in native code storage region 32 twice (S272).

As described above, in the present embodiment, the byte code is converted to the native code, and then compressed and stored. Thus, as compared with the conventional Java® VM using the JIT, the storage capacity of the RAM can be reduced.

In addition, the native code is compressed by the optimum compression mode on a method basis. Thus, the storage capacity of compressed native code storage region 34 may be smaller than that of the sixth embodiment.

Eighth Embodiment

Unlike the sixth and seventh embodiments, in the present embodiment, assume that the number of methods which can be stored in native code storage region 32 and compressed native code storage region 34 is limited.

A Java® virtual machine of the present embodiment is implemented with use of the built-in device described with reference to FIG. 1. Thus, the detailed description thereof will not be repeated here.

Further, the information stored in RAM 8 is the same as in FIG. 3. Thus, the detailed description thereof will not be repeated here.

Further, the information stored in ROM 4 is the same as that described with reference to FIG. 14. Thus, the detailed description thereof will not be repeated.

Figure 22:
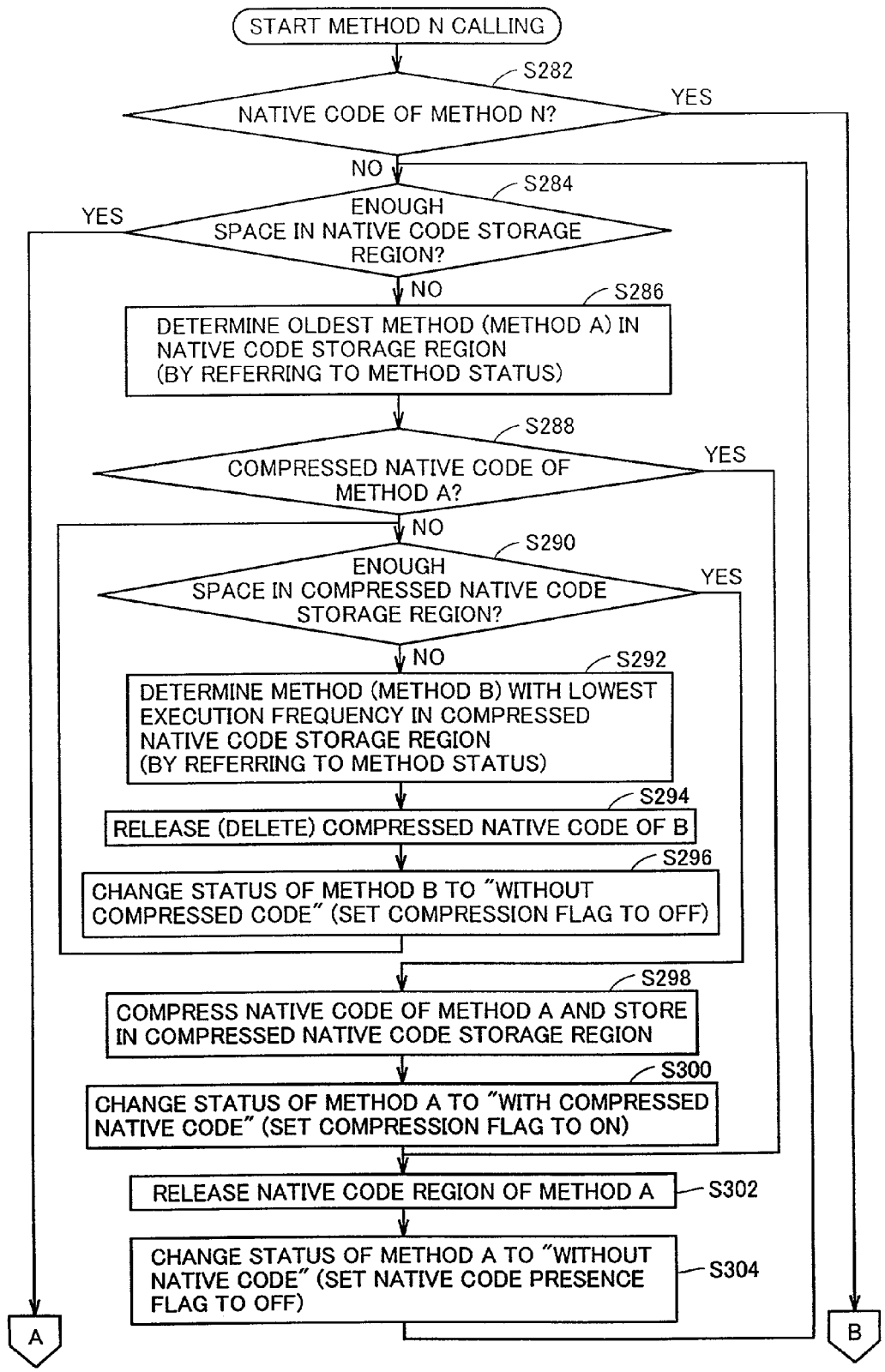
FIGS. 22 and 23 are flow charts showing a process when a method is called in an eighth embodiment.
Figure 23:
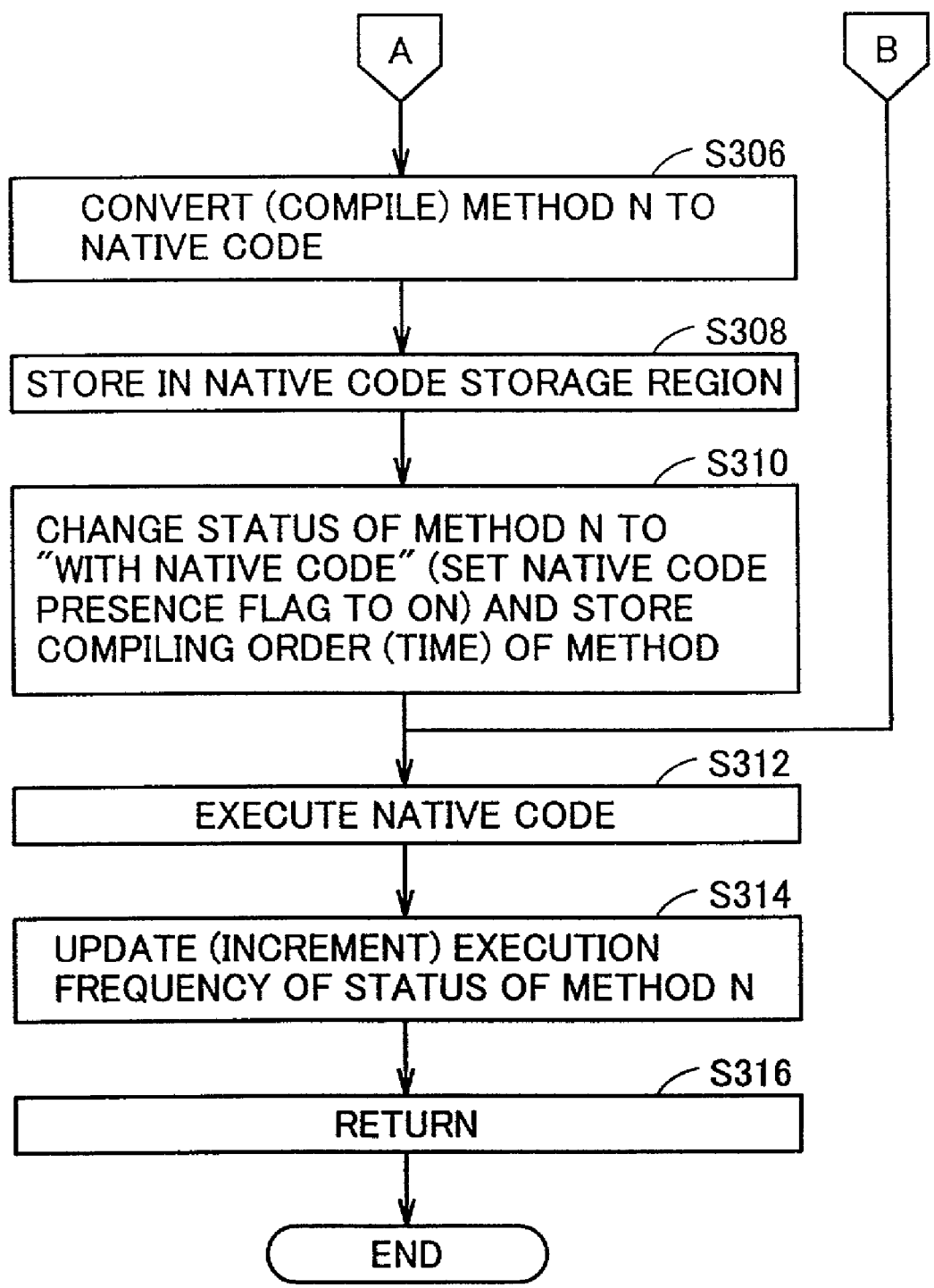

Referring to FIGS. 22 and 23, a process performed by CPU 2 when a method N is called by an upper module will be described. CPU 2 refers to a native code presence flag of method N that is stored in native code presence flag storage region 42, and determines if the native code of method N is stored in native code storage region 32 (S282).

If the native code of method N is not stored in native code storage region 32 (NO in S282), CPU 2 determines if there is any space available to an additional native code in native code storage region 32 (S284).

If there is no more space in native code storage region 32 (NO in S284), CPU 2 refers to the value of a compiling time (order) storage region 44 to find the oldest method in native code storage region 32 and determines it as a method A (S286).

CPU 2 determines if a compressed native code of method A is stored in compressed native code storage region 34 (S288). If the compressed native code of method A is not stored in compressed native code storage region 34 (NO in S288), CPU 2 determines if there is enough space in compressed native code storage region 34 (S290). If there is not enough space in compressed native code storage region 34 (NO in S290), CPU 2 determines a method with the lowest execution frequency in compressed native code storage region 34 based on the number of times being stored in a frequency storage region 38 and determines the method as method B (S292). CPU 2 releases, or deletes, the compressed native code method B (S294) and sets the compression flag of method B that is stored in compression flag storage region 48 to OFF (S296). Then, the process returns to S290.

If there is enough space in compressed native code storage region 34 (YES in S290), CPU 2 compresses the native code of method A for storage in compressed native code storage region 34 (S298). In addition, CPU 2 sets the compression flag of method A stored in compression flag storage region 48 to ON (S300).

If the compressed native code of method A is stored in compressed native code storage region 34 (YES in S288), or after S300, CPU 2 releases the region of native code storage region 32 in which the native code of method A is stored (S302). CPU 2 sets the native code presence flag of method A that is stored in native code presence flag storage region 42 to OFF (S304). Then, the process returns to S284.

If there is any space available to an additional native code of method N in native code storage region 32 (YES in S284), CPU 2 converts a byte code of method N to a native code (S306) for storage in native code storage region 32 (S308). Thereafter, CPU 2 sets the native code presence flag of method N to ON and stores the compiling order or time of method N in compiling time (order) storage region 44 (S310).

If the native code of method N is stored in native code storage region 32 (YES in S282), or after S310, CPU 2 executes the native code of method N (S312). In addition, CPU 2 increments the execution time of method N stored in frequency storage region 38 by 1 (S314). Thereafter, CPU 2 performs a process of returning to the calling side of method N (S316).

Figure 24:
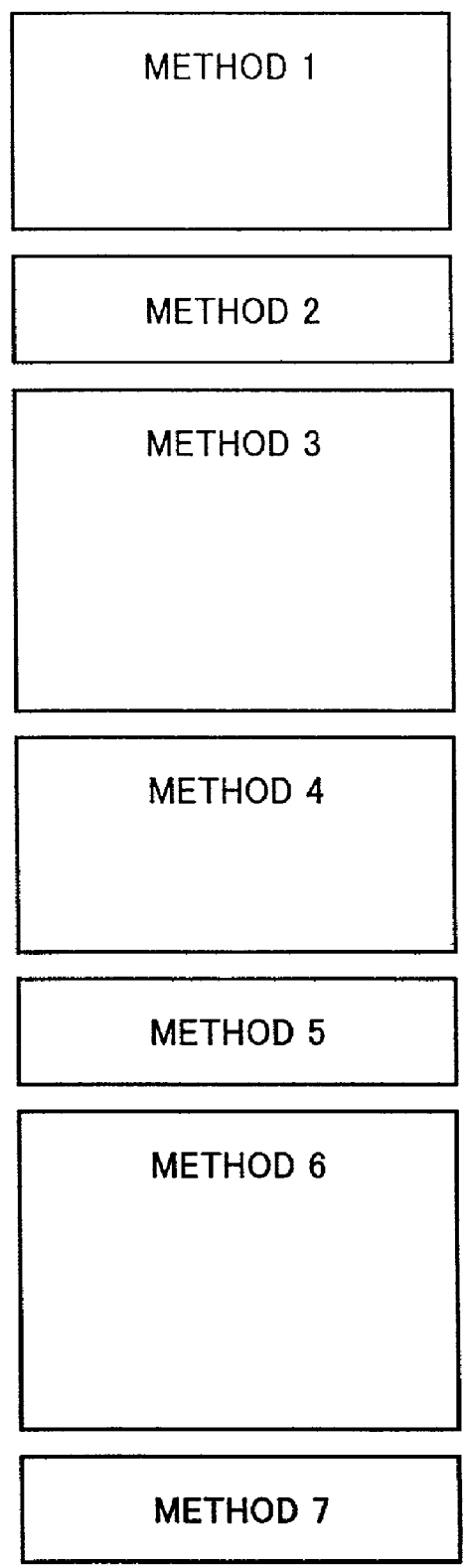
FIG. 24 is a diagram shown in conjunction with a program described in a Java® language.

Referring to FIG. 24, assume that a program described in the Java® language is formed of seven methods 1 to 7, which are sequentially called for execution in the order of methods 1, 2, 3, 1, 2, 4, 5, 6, and 7.

Note that the number of methods which can be stored in native code storage region 32 is 3, and the number of methods which can be stored in compressed native code storage region 34 is 3.

Figure 25:
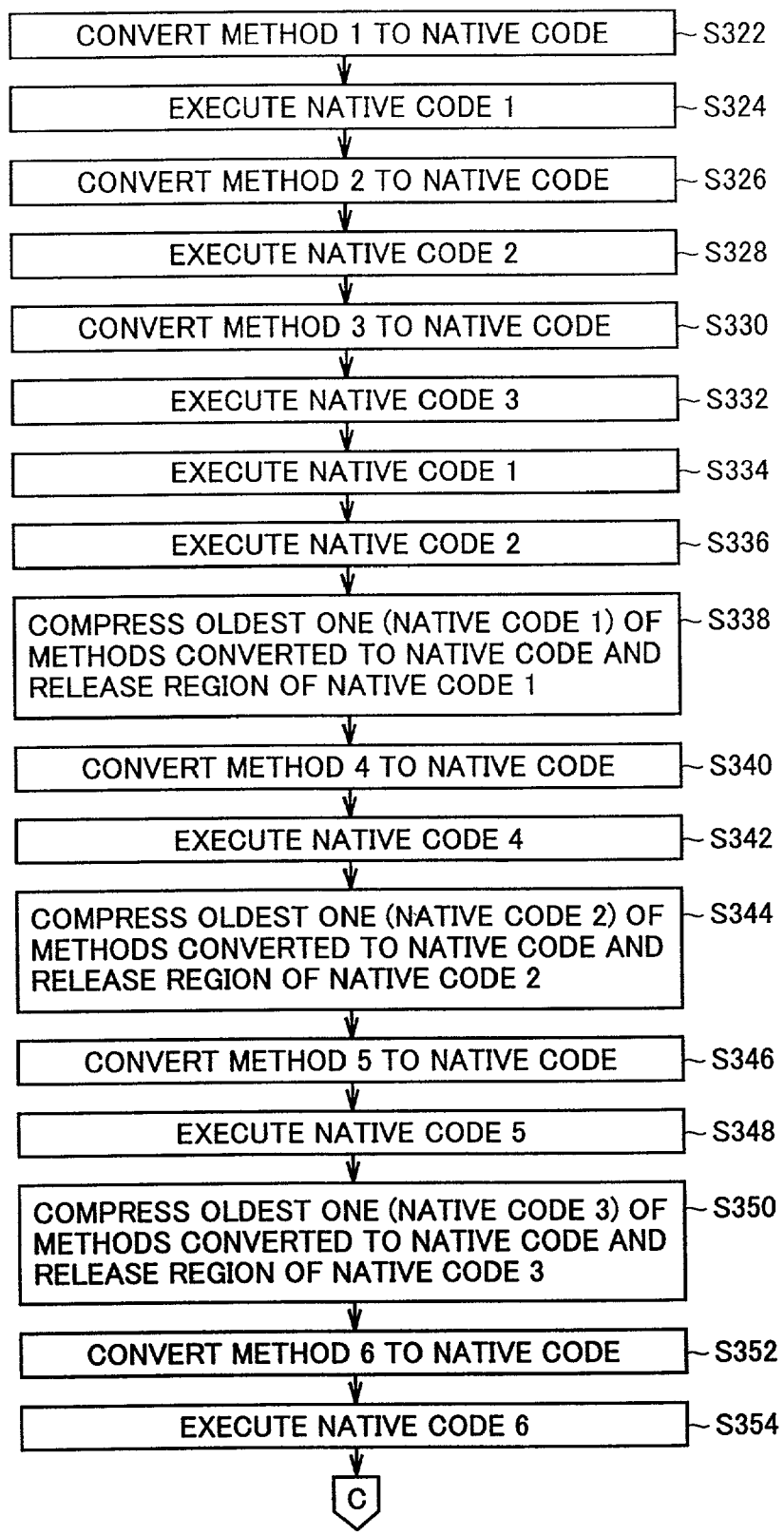
FIGS. 25 and 26 are flow charts showing a process when a method is called in the eighth embodiment.

Then, referring to FIGS. 25 to 27, CPU 2 performs a process in the following way.

CPU 2 converts method 1 to native code 1 for storage in a native code storage region 32 (S322). CPU 2 executes native code 1 (S324). CPU 2 converts method 2 to native code 2 for storage in native code storage region 32 (S326). CPU 2 executes native code 2 (S328). CPU 2 converts method 3 to native code 3 for storage in native code storage region 32 (S330). CPU 2 executes method 3 (S332). At this point of time, there are three native codes of three methods are stored in native code storage region 32. Thus, for storing a native code other than native codes 1 to 3, a region occupied by any native code has to be released.

CPU 2 executes native code 1 (S334) and executes native code 2 (S336).

In executing method 4, CPU 2 compresses the oldest native code 1 of the native codes stored in native code storage region 32 for storage in compressed native code storage region 34. Meanwhile, CPU 2 releases the region occupied by native code 1 of native code storage region 32 (S338). CPU 2 converts method 4 to a native code for storage in the region where native code 1 has been stored in native code storage region 32 (S340). CPU 2 executes native code 4 (S342).

In executing method 5, CPU 2 compresses the oldest native code 2 of the native codes stored in native code storage region 32 for storage in compressed native code storage region 34. Meanwhile, CPU 2 releases the region where native code 2 has been stored in native code storage region 32 (S344). CPU 2 converts method 5 to a native code for storage in the region of native code storage region 32 where native code 2 has been stored (S346). CPU 2 executes native code 5 (S348).

In executing method 6, CPU 2 compresses the oldest native code 3 of the native codes stored in native code storage region 32 for storage in compressed native code storage region 34. Meanwhile, CPU 2 releases the region of native code storage region 32 where native code 3 has been stored (S350). CPU 2 converts method 6 to a native code for storage in the region of native code storage region 32 where native code 3 has been stored (S352). CPU 2 executes native code 6 (S354).

Figure 27:
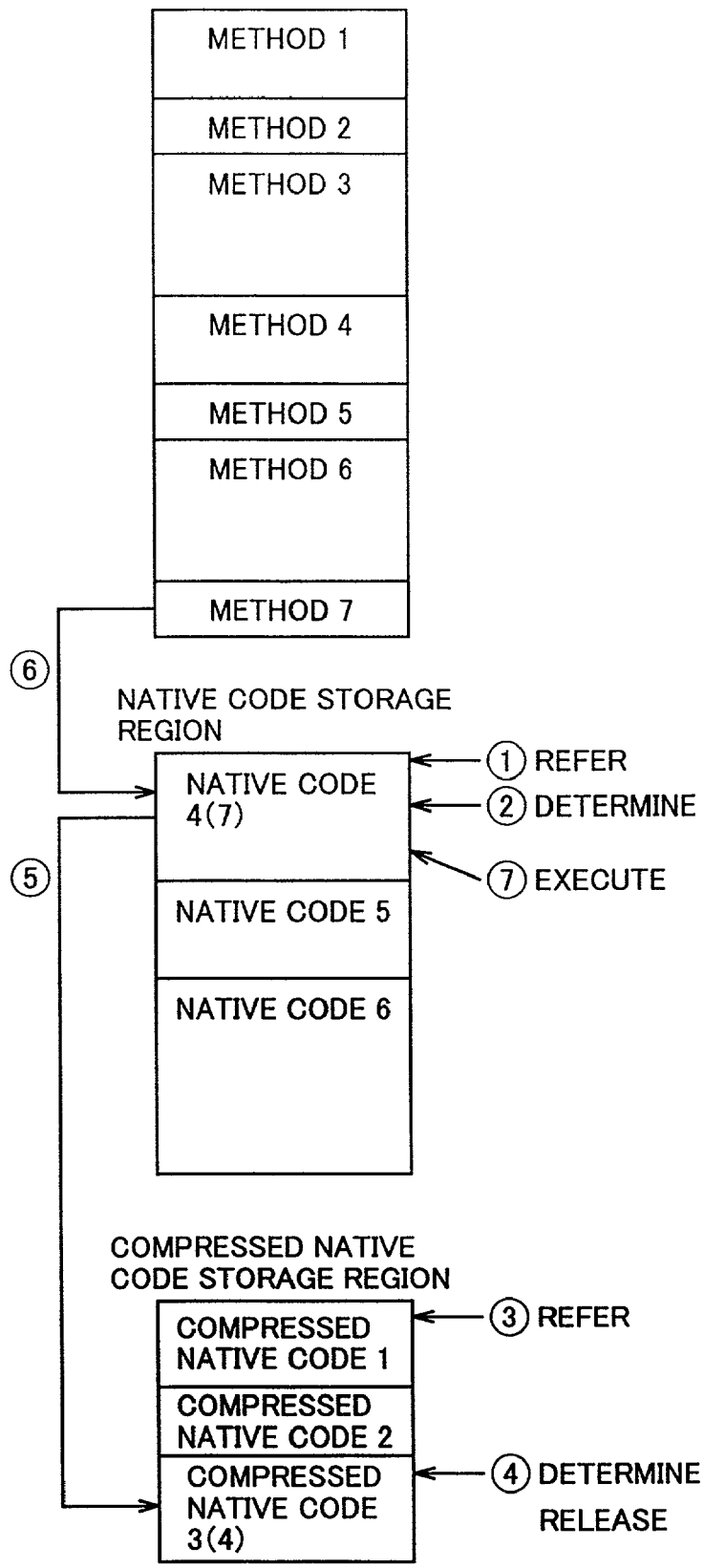
FIG. 27 is a diagram shown in conjunction with a process when a method is called in the eighth embodiment.

Referring to FIG. 27, at this point of time, native codes 4 to 6 are stored in native code storage region 32, and native codes 1 to 3 are stored in compressed native code storage region 34.

Figure 26:
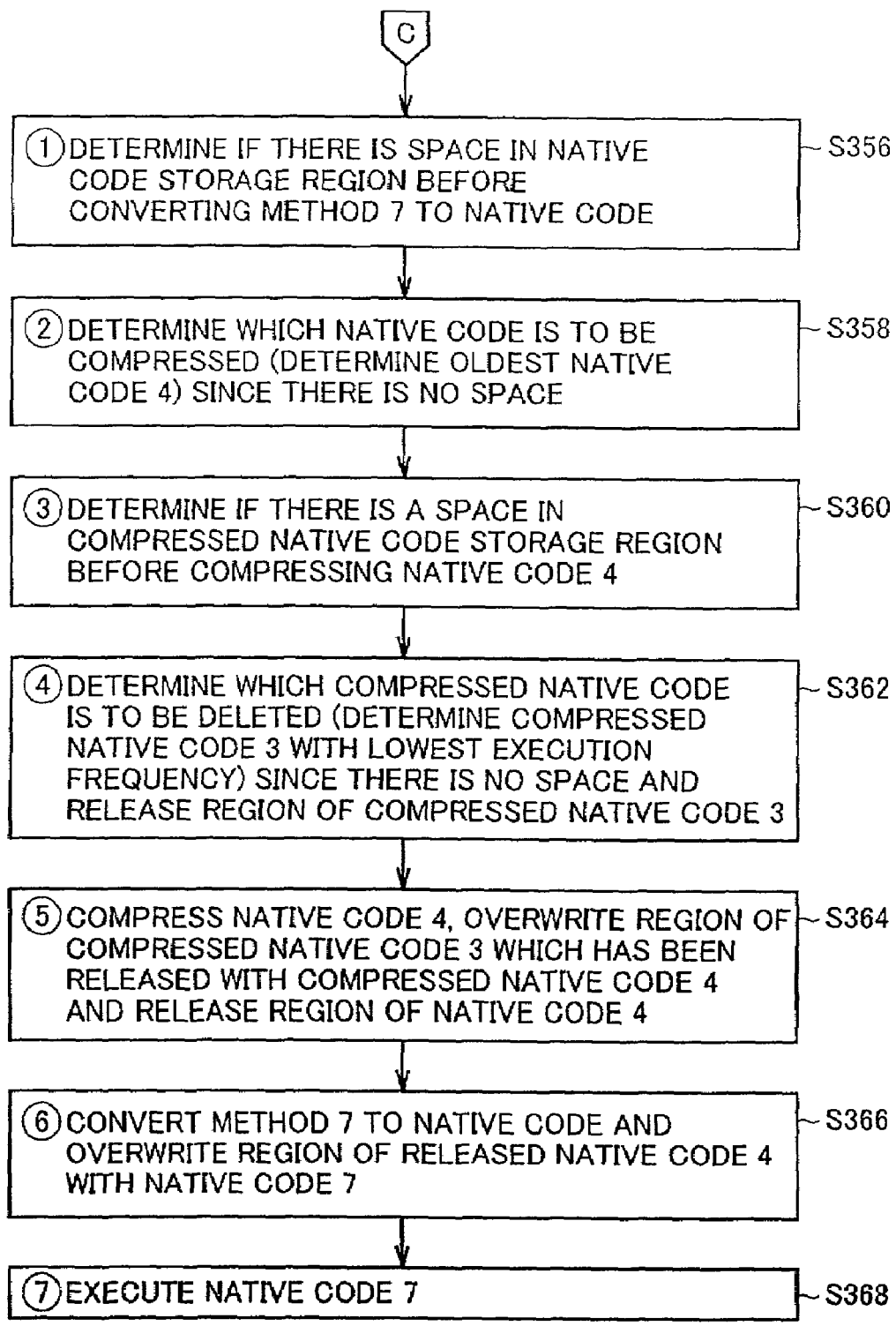

Referring to FIG. 26, CPU 2 determines if there is an empty region in native code storage region 32 before converting a byte code of method 7 to a native code (S356). Since there is no empty region in native code storage region 32, CPU 2 compresses the oldest native code 4 of the native codes stored in native code storage region 32 (S358).

CPU 2 determines if there is an empty space in compressed native code storage region 34 before compressing native code 4 (S360). Since there is no more space in compressed native code storage region 34, CPU 2 releases the region of compressed native code 3 with the lowest execution frequency of the compressed native codes stored in compressed native code storage region 34 (S362). CPU 2 compresses native code 4 and stores it in the region where compressed native code 3 has been stored in compressed native code storage region 34. Meanwhile, CPU 2 releases the region of native code storage region 32 where native code 4 has been stored (S364).

CPU 2 converts a byte code of method 7 to a native code 7 for storage in the region where method 4 has been stored in native code storage region 32 (S366). CPU 2 executes native code 7 (S368).

As described above, in the present embodiment, the byte code is converted to a native code, compressed and stored. Thus, as compared with the conventional Java® VM using the JIT, the required storage capacity of the RAM can be reduced.

In addition, since a plurality of native codes of methods can be stored in native code storage region 32, a process is performed at higher speed than in the seventh embodiment.

Ninth Embodiment

Unlike the eighth embodiment, in the present embodiment, a native code with the lowest execution frequency is selected when compressing a native code which cannot be stored in native code storage region 32 because of a space limitation.

A Java® virtual machine of the present embodiment is implemented with use of the built-in device described with reference to FIG. 1. Thus, the detailed description thereof will not be repeated here.

Further, the information stored in RAM 8 is the same as that described with reference to FIG. 3. Thus, the detailed description thereof will not be repeated here.

Further, the information stored in ROM 4 is the same as that described with reference to FIG. 14. Thus, the detailed description thereof will not be repeated here.

Figure 28:
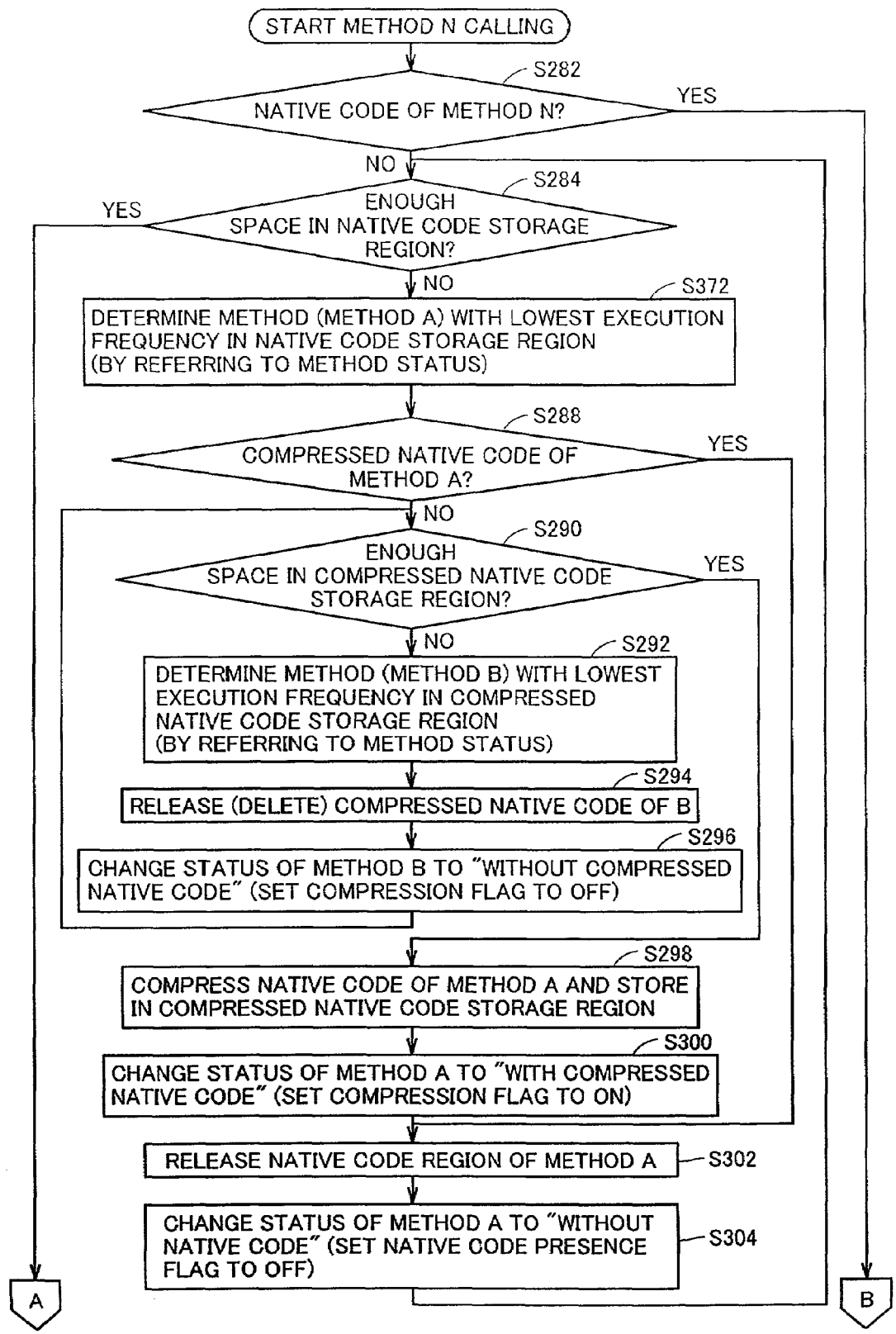
FIGS. 28 and 29 are flow charts showing a process when a method is called in a ninth embodiment.
Figure 29:
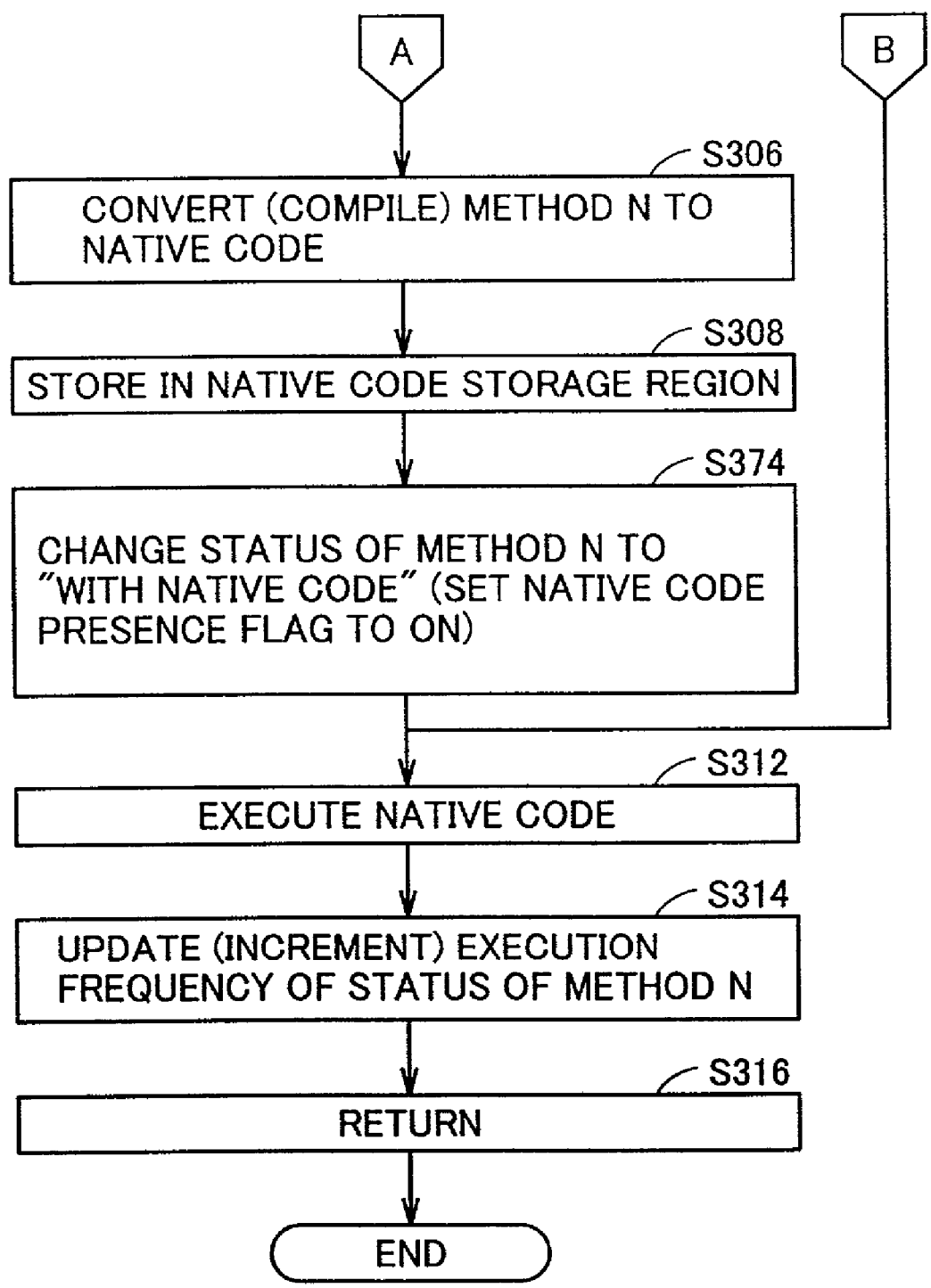

Referring to FIGS. 28 and 29, a process performed by CPU 2 when a method N is called by an upper module will be described. CPU 2 performs S372 in FIG. 28 in place of S286 of FIG. 22, and S374 of FIG. 29 in place of S310 of FIG. 23. The other processes are the same as those described with reference to FIGS. 22 and 23. Thus, the detailed description thereof will not be repeated.

In S372 of FIG. 28, CPU 2 determines the execution frequency of the native code stored in frequency storage region 38 to find a method with the lowest execution frequency in native code storage region 32. The method found is defined as method A.

In S374 of FIG. 29, CPU 2 sets the native code presence flag of method N to ON.

As described above, in the present embodiment, the byte code is converted to the native code and compressed for storage. Thus, as compared with the conventional Java® VM using the JIT, the required storage capacity of the RAM can be reduced.

In addition, since a plurality of native codes of methods can be stored in native code storage region 32, a process is performed at higher speed than in the seventh embodiment.

Tenth Embodiment

Unlike the eighth embodiment, in the present embodiment, a native code having the largest size is selected when compressing a native code which cannot be stored in native code storage region 32 because of a space limitation.

A Java® virtual machine of the present embodiment is implemented with use of the built-in device described with reference to FIG. 1. Thus, the detailed description thereof will not be repeated here.

The information stored in RAM 8 is the same as that described with reference to FIG. 3. Thus, the detailed description thereof will not be repeated here.

Further, the information stored in ROM 4 is the same as that described with reference to FIG. 14. Thus, the detailed description thereof will not be repeated here.

Figure 30:
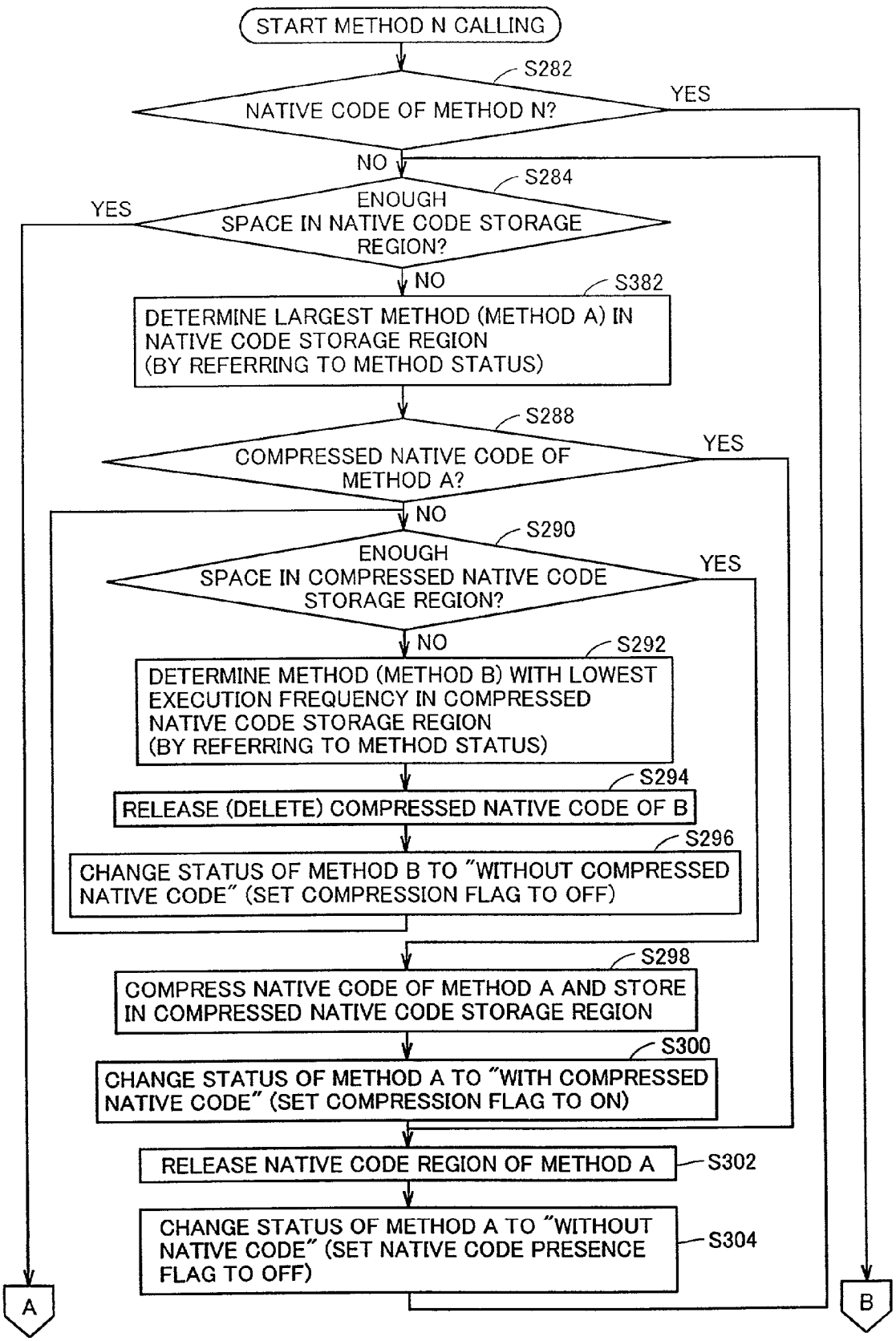
FIGS. 30 and 31 are flow charts showing a process when a method is called in a tenth embodiment.
Figure 31:
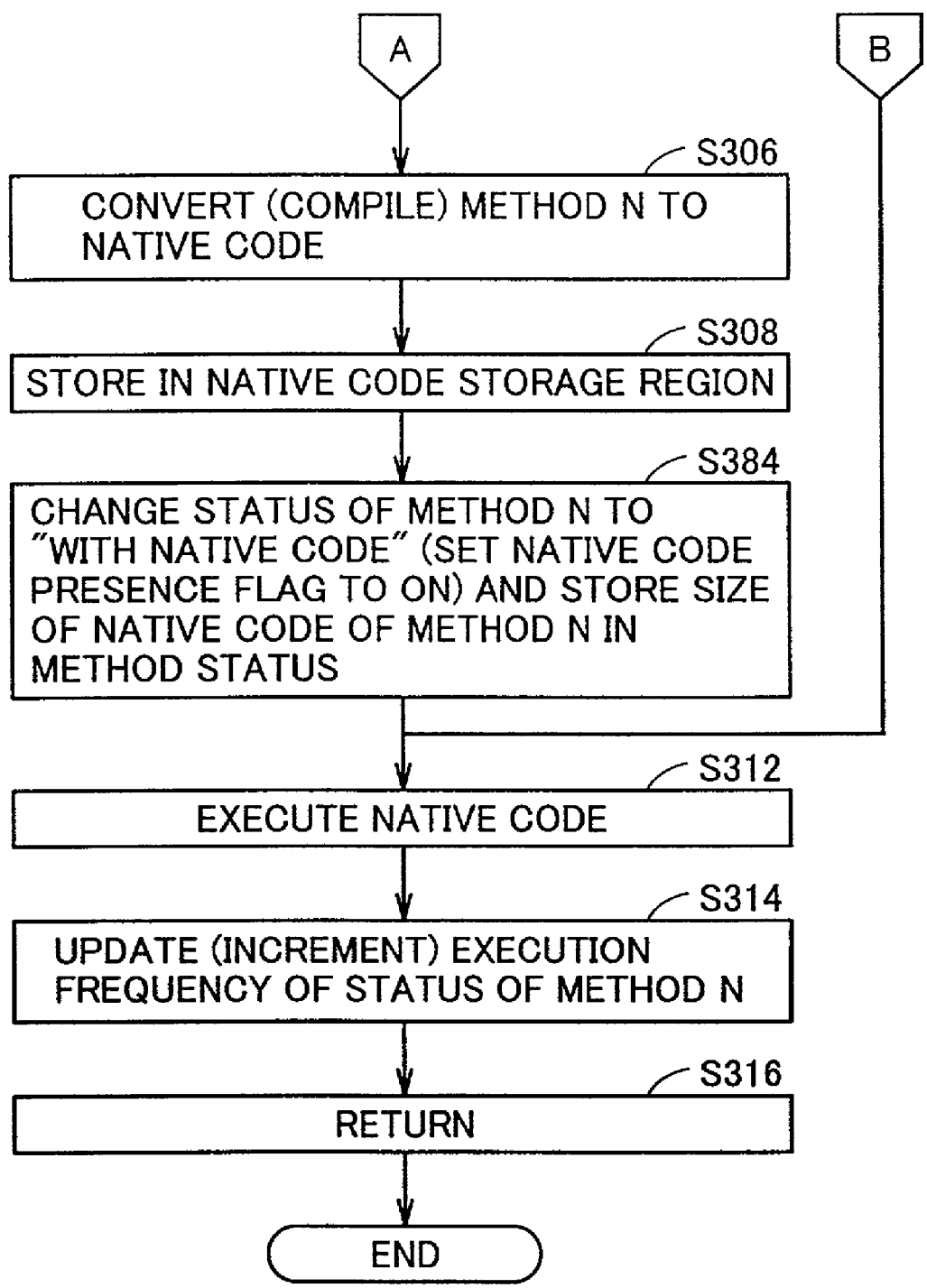

Referring to FIGS. 30 and 31, a process of CPU 2 when a method N is called by an upper module will be described. CPU 2 performs S382 of FIG. 30 in place of S286 of FIG. 22, and S384 of FIG. 31 in place of S310 of FIG. 23. The other processes are the same as those of FIGS. 22 and 23. Thus, the detailed description thereof will not be repeated here.

In S382 of FIG. 30, CPU 2 determines the size of the native code stored in size storage region 40 to find a method having the native code of the largest size in native code storage region 32. The method found is defined as a method A.

In S384 of FIG. 31, CPU 2 sets a native code presence flag of method N to ON. The size of the native code of method N is stored in size storage region 40.

As described above, in the present embodiment, the byte code is converted to the native code and compressed for storage. Thus, as compared with the conventional Java® VM using the JIT, the required storage capacity of the RAM can be reduced.

In addition, since a plurality of native codes of methods can be stored in native code storage region 32, a process is performed at higher speed than in the seventh embodiment.

Eleventh Embodiment

Unlike the eighth embodiment, in the present embodiment, a native code with the highest compression ratio is selected when compressing a native code which cannot be stored in native code storage region 32.

A Java® virtual machine of the present embodiment is implemented with use of the built-in device described with reference to FIG. 1. Thus, the detailed description thereof will not be repeated here.

In addition, the information stored in RAM 8 is the same as that described with reference to FIG. 3. Thus, the detailed description thereof will not be repeated here.

Further, the information stored in ROM 4 is the same as that described with reference to FIG. 14. Thus, the detailed description thereof will not be repeated here.

Figure 32:
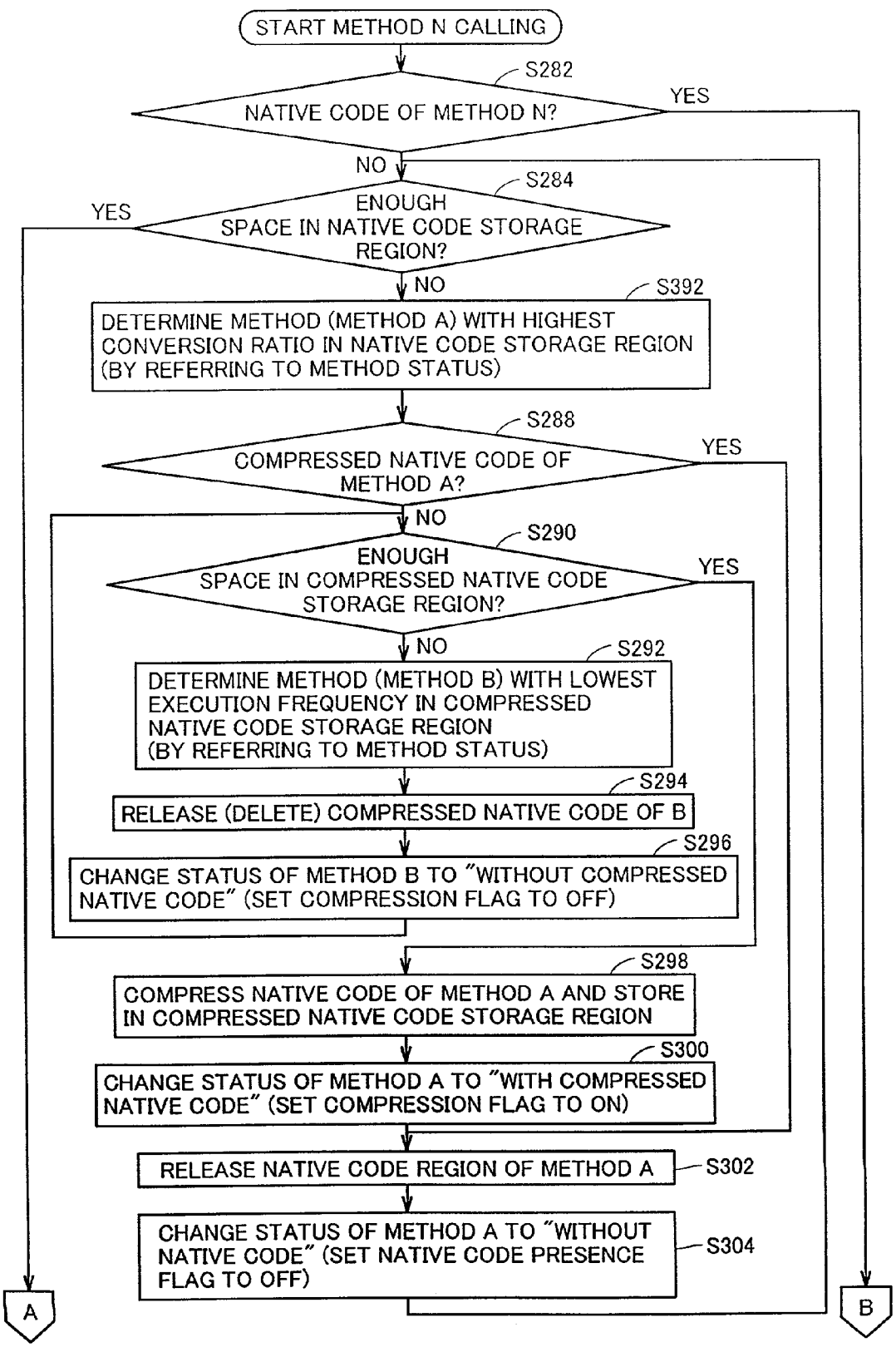
FIGS. 32 and 33 are flow charts showing a process when a method is called in an eleventh embodiment.
Figure 33:
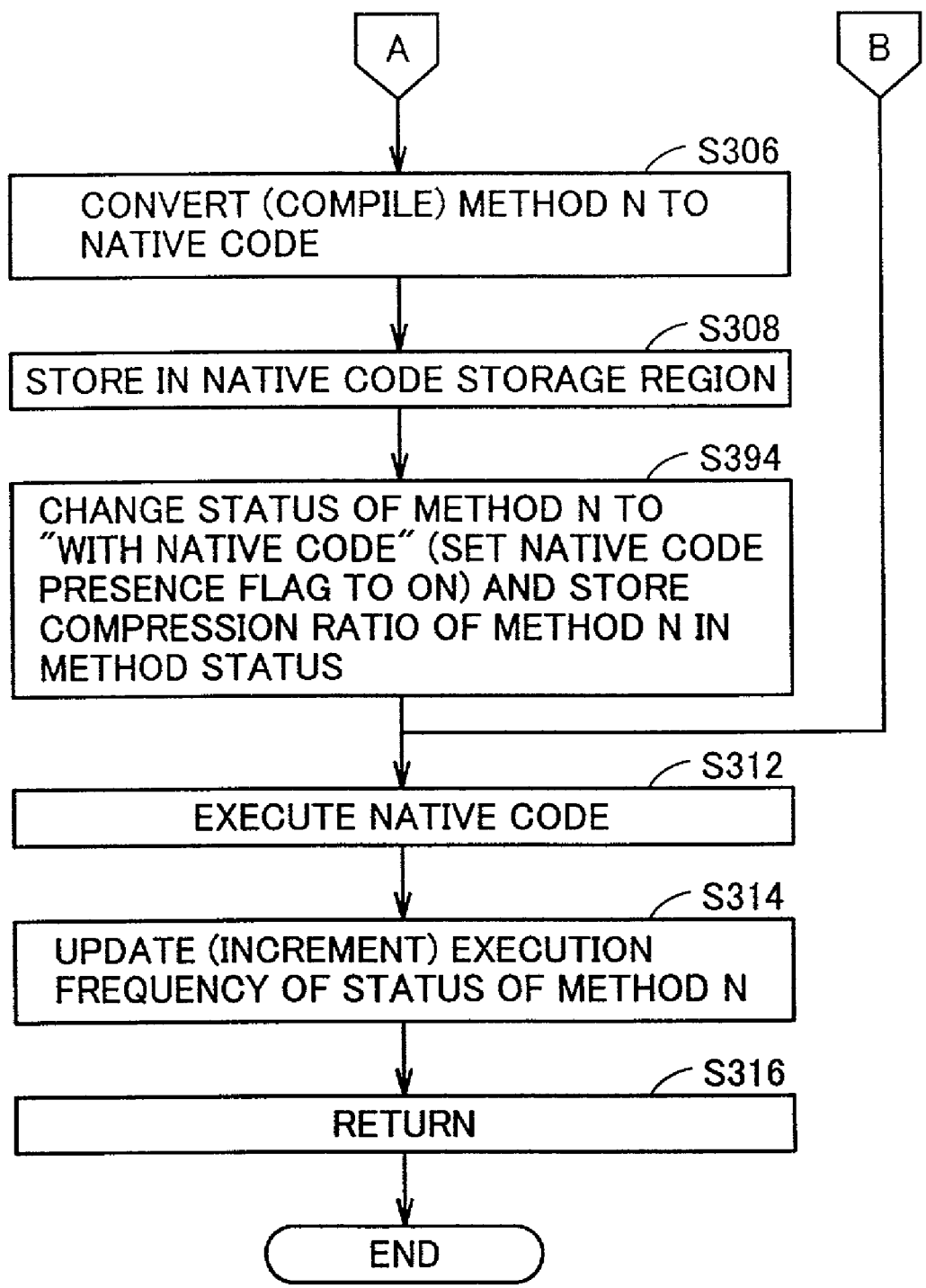

Referring to FIGS. 32 and 33, a process of CPU 2 when a method N is called by an upper module will be described. CPU 2 performs S392 of FIG. 32 in place of S286 of FIG. 22, and S394 of FIG. 33 in place of S310 of FIG. 23. The other processes are the same as those of FIGS. 22 and 23. Thus, the detailed description thereof will not be repeated here.

In S392 of FIG. 32, CPU 2 refers to a compression ratio when compressing the native code stored in compression ratio storage region 54 to find a method with the highest compression ratio in native code storage region 32. The method found is defined as method A.

In S394 of FIG. 33, CPU 2 sets a native code presence flag of method N to ON, and stores the compression ratio when compressing the native code of method N in compression ratio storage region 54.

As described above, in the present embodiment, the byte code is converted to the native code and compressed for storage. Thus, as compared with the conventional Java® VM using the JIT, the required storage capacity of the RAM can be reduced.

In addition, since a plurality of native codes of methods can be stored in native code storage region 32, a process can be performed at higher speed than in the seventh embodiment.

Twelfth Embodiment

Unlike the eighth embodiment, in the present embodiment, a compressed native code having the largest size is selected when releasing a compressed native code which cannot be stored in compressed native code storage region 34.

A Java® virtual machine of the present embodiment is implemented with use of the built-in device described with reference to FIG. 1. Thus, the detailed description thereof will not be repeated here.

The information stored in RAM 8 is the same as that described with reference to FIG. 3. Thus, the detailed description thereof will not be repeated here.

Further, the information stored in ROM 4 is the same as that described with reference to FIG. 14. Thus, the detailed description thereof will not be repeated here.

Figure 34:
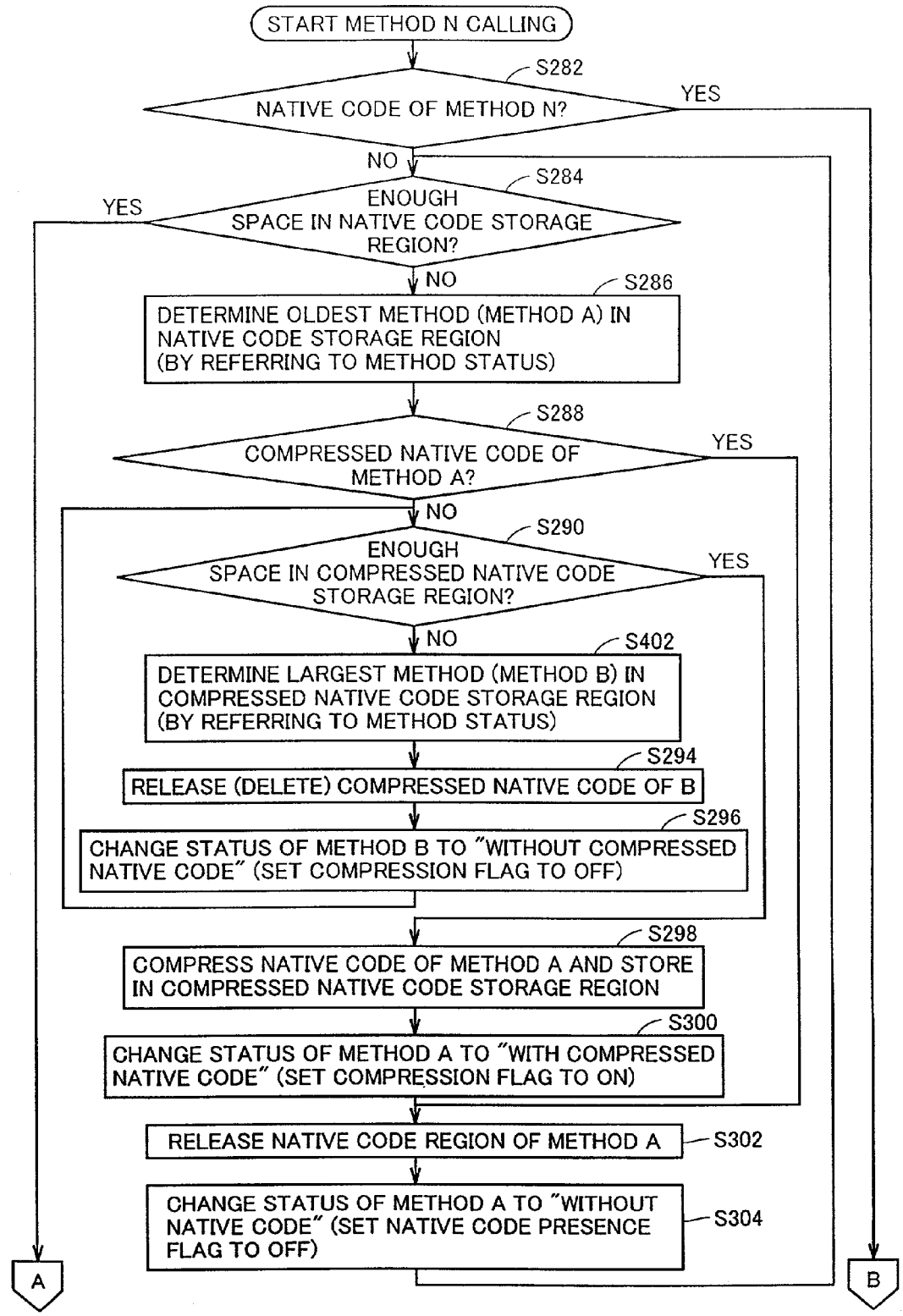
FIGS. 34 and 35 are flow charts showing a process when a method is called in a twelfth embodiment.
Figure 35:
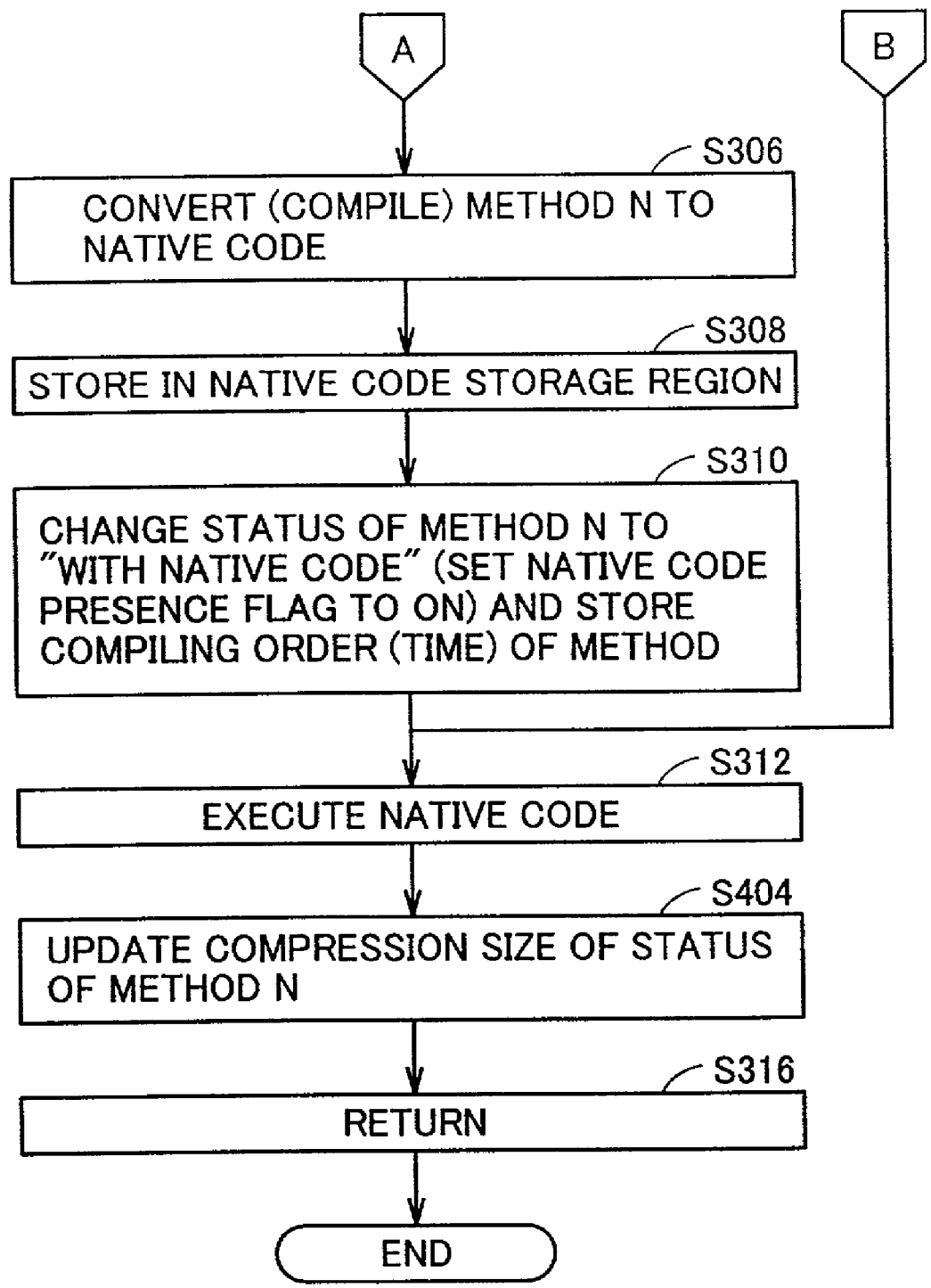

Referring to FIGS. 34 and 35, a process of CPU 2 when a method N is called by an upper module will be described. CPU 2 performs S402 of FIG. 34 in place of S292 of FIG. 22, and S404 of FIG. 35 in place of S314 of FIG. 23. The other processes are the same as those of FIGS. 22 and 23. Thus, the detailed description thereof will not be repeated here.

In S402 of FIG. 34, CPU 2 refers to the sizes of the compressed native codes stored in compression size storage region 58 to find a method having the compressed native code of the largest size in compressed native code storage region 34. The method found is defined as method A.

In S404 of FIG. 35, CPU 2 determines the size of the compressed native code of method N and stores the size found in compression size storage region 58.

As described above, in the present embodiment, the byte code is converted to the native code and compressed for storage. Thus, as compared with the conventional Java® VM using the JIT, the required storage capacity of the RAM can be reduced.

In addition, since a plurality of native codes of methods can be stored in native code storage region 32, a process can be performed at higher speed than in the seventh embodiment.

Thirteenth Embodiment

Unlike the eighth embodiment, in the present embodiment, a compressed native code with the lowest compression ratio is selected when releasing a compressed native code which cannot be stored in compressed native code storage region 34.

A Java® virtual machine of the present embodiment is implemented with use of the built-in device described with reference to FIG. 1. Thus, the detailed description thereof will not be repeated here.

In addition, the information stored in RAM 8 is the same as that described with reference to FIG. 3. Thus, the detailed description thereof will not be repeated here.

Further, the information stored in ROM 4 is the same as that described with reference to FIG. 14. Thus, the detailed description thereof will not be repeated here.

Figure 36:
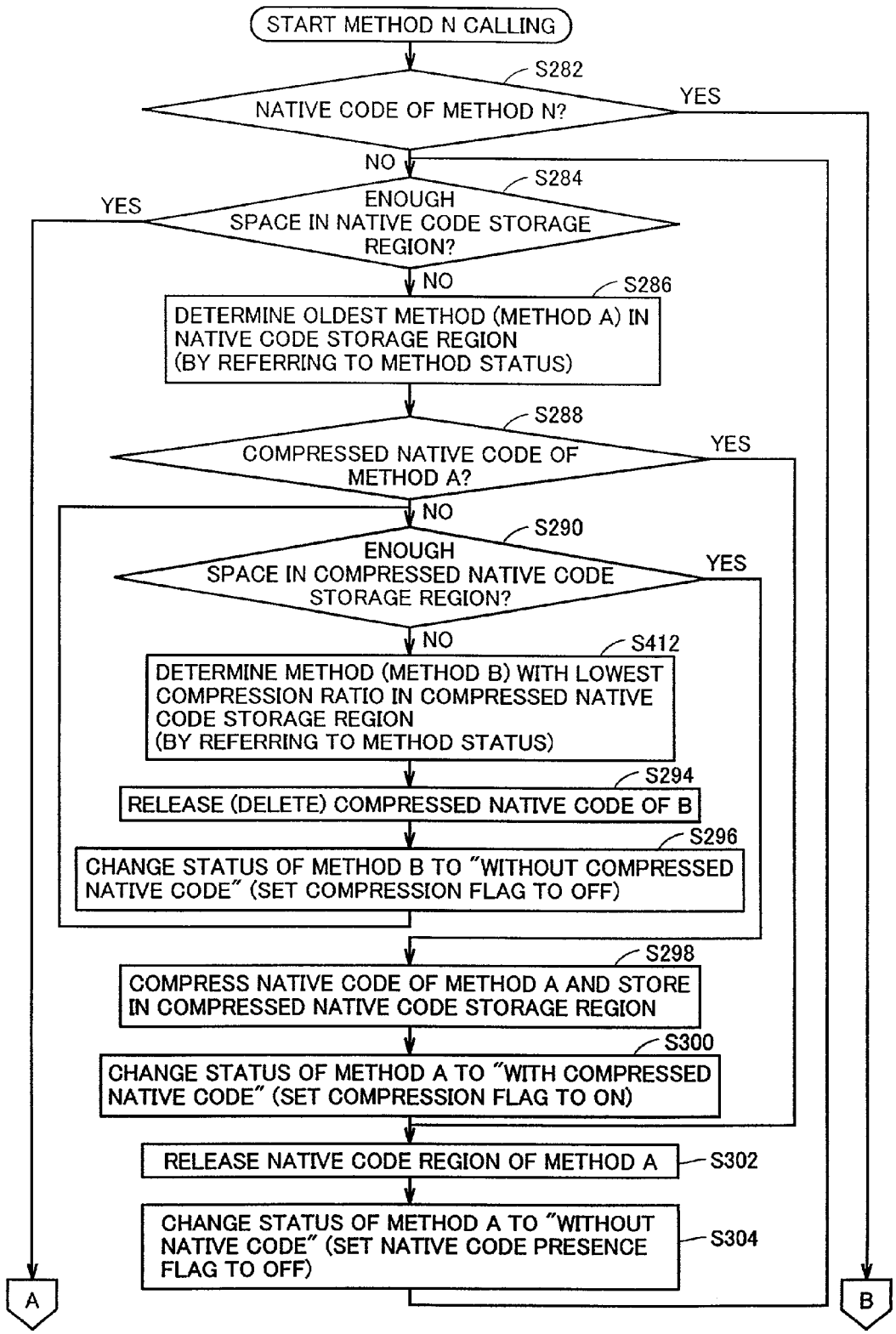
FIGS. 36 and 37 are flow charts showing a process when a method is called in a thirteenth embodiment.
Figure 37:
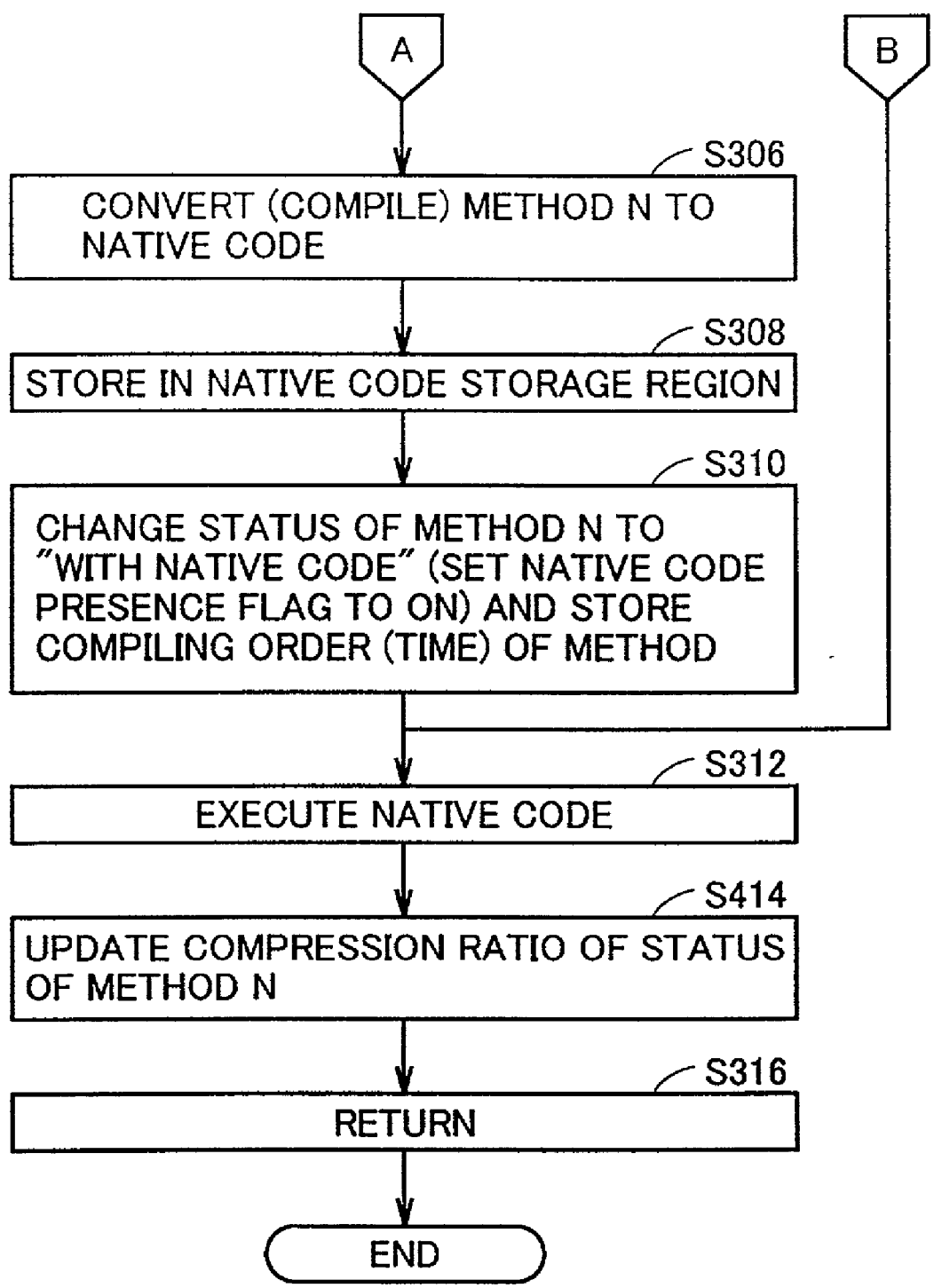

Referring to FIGS. 36 and 37, a process of CPU 2 when a method N is called by an upper module will be described. CPU 2 performs S412 of FIG. 36 in place of S292 of FIG. 22, and S414 of FIG. 37 in place of S314 of FIG. 23. The other processes are the same as those described with reference to FIGS. 22 and 23. Thus, the detailed description thereof will not be repeated here.

In S412 of FIG. 36, CPU 2 refers to a conversion ratio of a native code stored in compression ratio storage region 54 to find a method having a compressed native code with the lowest compression ratio in compressed native code storage region 34. The method found is defined as method A.

In S414 of FIG. 37, CPU 2 refers to the compression ratio when compressing the native code of method N for storage in compression ratio storage region 54.

As described above, in the present embodiment, the byte code is converted to the native code and then compressed for storage. Thus, as compared with the conventional Java® VM using the JIT, the required storage capacity of the RAM can be reduced.

In addition, since a plurality of native codes of methods can be stored in native code storage region 32, a process can be performed at higher speed than in the seventh embodiment.

Fourteenth Embodiment

Unlike the eighth embodiment, in the present embodiment, the oldest compressed native code is selected when releasing a compressed native code which cannot be stored in compressed native code storage region 34.

A Java® virtual machine of the present embodiment is implemented with use of the built-in device described with reference to FIG. 1. Thus, the detailed description thereof will not be repeated here.

The information stored in RAM 8 is the same as that described with reference to FIG. 3. Thus, the detailed description thereof will not be repeated here.

Further, the information stored in ROM 4 is the same as that described with reference to FIG. 14. Thus, the detailed description thereof will not be repeated here.

Figure 38:
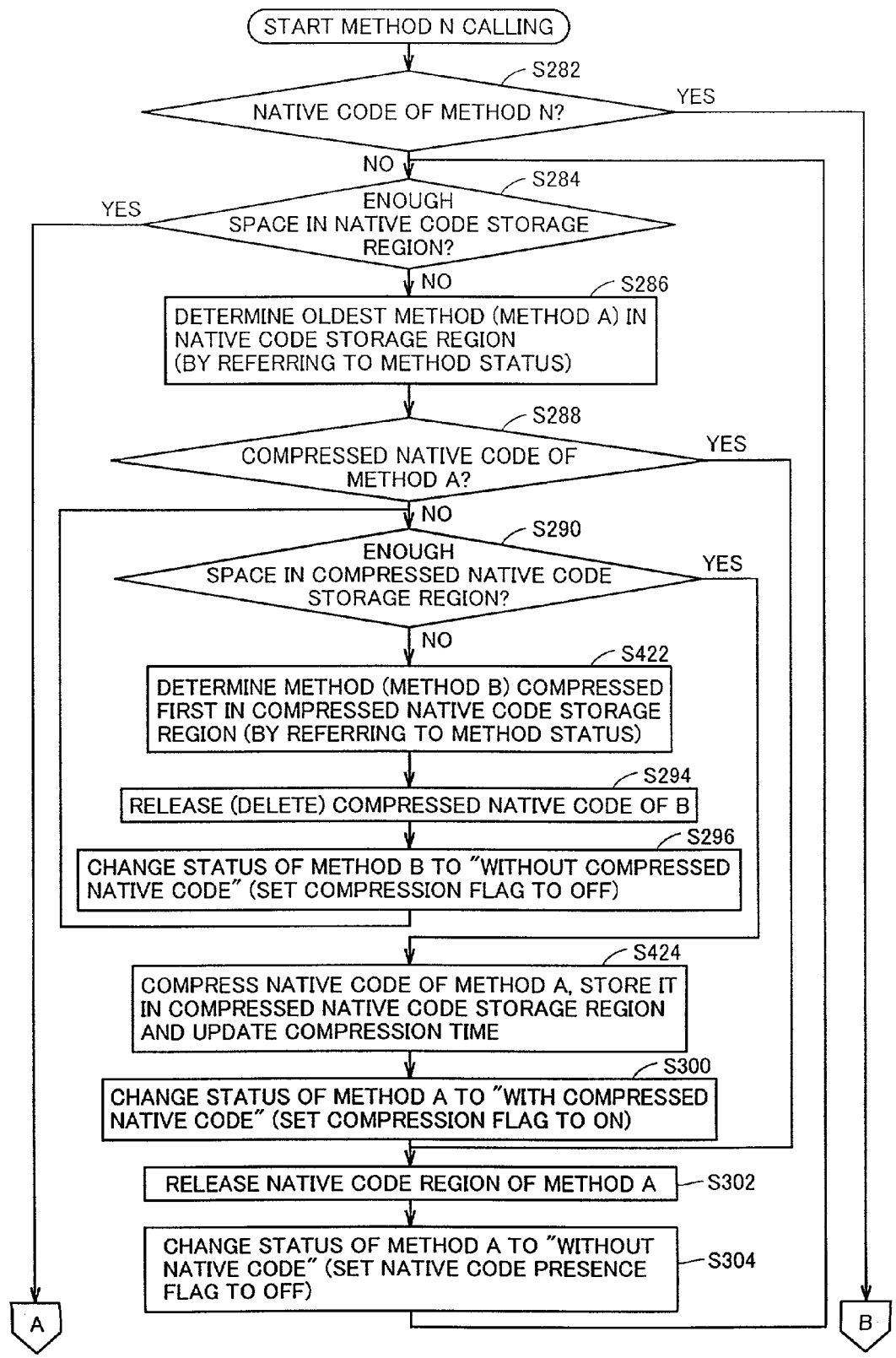
FIGS. 38 and 39 are flow charts showing a process when a method is called in a fourteenth embodiment.
Figure 39:
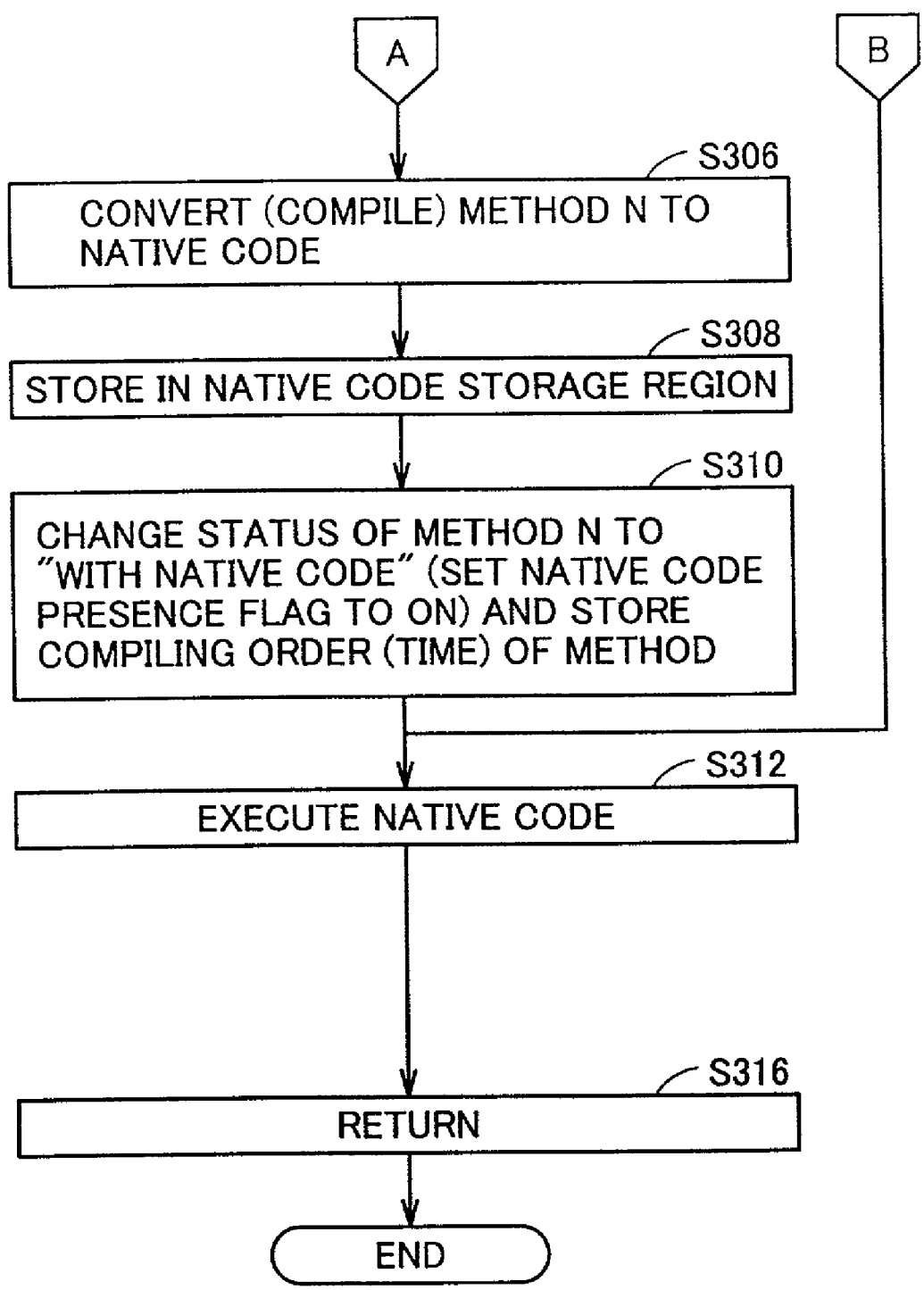

Referring to FIGS. 38 and 39, a process of CPU 2 when a method N is called by an upper module will be described. CPU 2 performs S422 and S424 of FIG. 38 respectively in place of S292 and in S298 of FIG. 22. CPU 2 does not perform S314 of FIG. 23 (a process of FIG. 39). The other processes are the same as those of FIGS. 22 and 23. Thus, the detailed description thereof will not be repeated here.

In S422 of FIG. 38, CPU 2 refers to a compression time stored in compression time (order) storage region 56 to find a method having the oldest compressed native code in compressed native code storage region 34. The method found is defined as a method A.

In S424 of FIG. 38, CPU 2 compresses a native code of method A for storage in compressed native code storage region 34. Meanwhile, CPU 2 stores the compression time in compression time (order) storage region 56.

As described above, in the present embodiment, the byte code is converted to the native code and then compressed for storage. Thus, as compared with the conventional Java® VM using the JIT, the required storage capacity of the RAM can be reduced.

In addition, since a plurality of native codes of methods can be stored in native code storage region 32, a process can be performed at higher speed than in the seventh embodiment.

It is noted that the inventions described in the first to fourteenth embodiments can also be applied to a program which is described in an object oriented language other than a Java® language and compiled into an intermediate language.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A program execution device of executing a program described in a non-native code format of a prescribed language, comprising:
   a compressed code storing portion storing a code of said program compressed on a prescribed unit basis;
   an expanding portion connected to said compressed code storing portion for expanding said compressed code stored in said compressed code storing portion;
   a code storing portion connected to said expanding portion for storing the code expanded by said expanding portion; and
   an interpreter portion connected to said code storing portion for interpreting said expanded code for execution in said non-native code format,
   wherein said expanding portion expands a first compressed code stored in said compressed code storing portion, stores a first expanded code in said code storing portion and holds said first compressed code in said compressed code storing portion,
   after said interpreter portion interprets said first expanded code for execution, said expanding portion expands a second compressed code stored in said compressed code storing portion, overwrites a second expanded code on said first expanded code in said code storing portion and holds said second compressed code in said compressed code storing portion, and
   after said interpreter portion interprets said second expanded code for execution, said expanding portion expands said first compressed code stored in said compressed code storing portion and overwrites said first expanded code on said second expanded code in said code storing portion.

2. The program execution device according to claim 1, wherein said prescribed language is an object oriented language and said prescribed unit is a method.

3. The program execution device according to claim 1, wherein said prescribed unit is a series of instructions not containing branching in the program.

4. The program execution device according to claim 1, wherein said prescribed unit is an instruction.

5. The program execution device according to claim 1, further comprising a compression mode determining portion connected to said compressed code storing portion for determining a compression mode of said code based on said compressed code, said expanding portion being connected to said compression mode determining portion for expanding said compressed code and storing in said code storing portion in accordance with an output from said compression mode determining portion.

6. A program execution device of executing a program described in an object oriented language, said program being described in a code other than a code native to said program execution device, comprising:
   a compressed code storing portion storing a code of said program compressed on a method basis;
   an expanding portion connected to said compressed code storing portion for expanding said compressed code;
   a code storing portion connected to said expanding portion for storing the code expanded by said expanding portion;
   a converting portion connected to said code storing portion for converting said expanded code to a native code;
   a native code storing portion connected to said converting portion for storing the native code output from said converting portion;

a native code executing portion connected to said native code storing portion for executing said native code; and an interpreter portion for interpreting said expanded code for execution in a non-native code format, wherein said expanding portion expands a first compressed code stored in said compressed code storing portion, stores a first expanded code in said code storing portion and holds said first compressed code in said compressed code storing portion, after said converting portion converts said first expanded code to a first native code or said interpreter portion interprets said first expanded coded for execution, said expanding portion expands a second compressed code stored in said compressed code storing portion, overwrites a second expanded code on said first expanded code in said code storing portion and holds said second compressed code in said compressed code storing portion, and after said converting portion converts said second expanded code to a second native code or said interpreter portion interprets said second expanded code for execution, said expanding portion expands said first compressed code stored in said compressed code storing portion and overwrites said first expanded code on said second expanded code in said code storing portion.

7. The program execution device according to claim 6, wherein said native code storing portion is formed of a cache memory.

8. The program execution device according to claim 6, further comprising:

a code storing portion storing a code of a method of said program described in said non-native code format;

a compressed native code storing portion storing a compressed native code obtained by compressing the native code of the method;

a first determining portion connected to said native code storing portion for determining if a native code of a desired method is stored in said native code storing portion;

a second determining portion connected to said compressed native code storing portion for determining if a compressed native code of said desired method is stored in said compressed native code storing portion;

a native code storage controlling portion connected to said first and second determining portions, said compressed native code storing portion, said code storing portion and said native code storing portion for selectively executing expansion of the compressed native code stored in said compressed native code storing portion or conversion of the code stored in said code storing portion to a native code and storing the resultant native code to said native code storing portion in accordance with outputs from said first and second determining portions; and a native code compressing and storing portion connected to said second determining portion, said native code storing portion and said compressed native code storing portion for compressing the executed native code and storing it in said compressed native code storing portion in accordance with the output from said second determining portion.

9. The program execution device according to claim 8, further comprising a compression mode storing portion storing a compression mode of the compressed native code stored in said compressed native code storing portion on a method basis, wherein said native code storage controlling portion is connected to said compression mode storing portion for selectively executing expansion of the compressed native code stored in said compressed native code storing portion in accordance with the compression mode stored in said compression mode storing portion or conversion of the code stored in said code storing portion to a native code and storing the resultant native code in said native code storing portion, and said native code compressing and storing portion is connected to said compression mode storing portion for compressing the executed native code by a compression mode determined by a predetermined method, storing the compressed native code in said compressed native code storing portion and storing said compression mode in said compression mode storing portion in accordance with the output from said second determining portion.

10. The program execution device according to claim 8, wherein said native code compressing and storing portion compresses with highest priority a native code converted first of methods stored in said native code storing portion.

11. The program execution device according to claim 8, wherein said native code compressing and storing portion compresses with highest priority a native code having a lowest execution frequency of methods stored in said native code storing portion.

12. The program execution device according to claim 8, wherein said native code compressing and storing portion compresses with highest priority a native code having the largest size of methods stored in said native code storing portion.

13. The program execution device according to claim 8, wherein said native code compressing and storing portion compresses with highest priority a native code having a highest compression ratio of methods stored in said native code storing portion.

14. The program execution device according to claim 8, wherein said native code compressing and storing portion deletes a compressed native code with a lowest execution frequency of methods stored in a compressed native code storage region when there is no more space in said compressed native code storage region.

15. The program execution device according to claim 8, wherein said native code compressing and storing portion deletes a compressed native code having a largest size of methods stored in a compressed native code storage region if there is no more space in said compressed native code storage region.

16. The program execution device according to claim 8, wherein said native code compressing and storing portion deletes a compressed native code with a lowest compression ratio of methods stored in a compressed native code storage region when there is no more space in said compressed native code storage region.

17. The program execution device according to claim 8, wherein said native code compressing and storing portion deletes a compressed native code compressed first of methods stored in a compressed native code storage region when there is no more space in said compressed native code storage region.

* * * * *